(12) United States Patent
Cheng

(10) Patent No.: US 8,237,489 B2
(45) Date of Patent: Aug. 7, 2012

(54) CAPACITANCE INTERFACE CIRCUIT

(75) Inventor: Ping-Pao Cheng, Hsinchu County (TW)

(73) Assignee: ITE Tech. Inc., Hsinchu (TW)

( * ) Notice: Subject to any disclaimer, the term of this patent is extended or adjusted under 35 U.S.C. 154(b) by 0 days.

(21) Appl. No.: 12/846,829

(22) Filed: Jul. 30, 2010

(65) Prior Publication Data

US 2010/0289555 A1 Nov. 18, 2010

Related U.S. Application Data

(63) Continuation-in-part of application No. 12/490,306, filed on Jun. 23, 2009, now Pat. No. 8,169,251.

(30) Foreign Application Priority Data

Apr. 7, 2009 (TW) ................................ 98111490 A
Jun. 9, 2010 (TW) ................................ 99118750 A

(51) Int. Cl.
*G06F 7/64* (2006.01)

(52) U.S. Cl. ............ 327/337; 327/94; 327/95; 324/658; 324/679

(58) Field of Classification Search ...................... 327/91, 327/94–95, 337; 324/658, 679
See application file for complete search history.

(56) References Cited

U.S. PATENT DOCUMENTS

| | | | | |
|---|---|---|---|---|
| 5,001,725 A | * | 3/1991 | Senderowicz et al. | 375/247 |
| 5,072,219 A | * | 12/1991 | Boutaud et al. | 341/150 |
| 5,563,597 A | * | 10/1996 | McCartney | 341/150 |
| 6,040,793 A | * | 3/2000 | Ferguson et al. | 341/143 |
| 6,323,801 B1 | * | 11/2001 | McCartney et al. | 341/172 |
| 6,351,506 B1 | * | 2/2002 | Lewicki | 375/350 |
| 6,452,514 B1 | | 9/2002 | Philipp | |
| 6,509,790 B1 | * | 1/2003 | Yang | 327/554 |
| 6,617,908 B1 | | 9/2003 | Thomsen et al. | 327/337 |
| 6,970,126 B1 | * | 11/2005 | O'Dowd et al. | 341/172 |
| 7,038,532 B1 | * | 5/2006 | Bocko et al. | 327/554 |
| 7,061,413 B2 | * | 6/2006 | Boemler | 341/120 |
| 7,068,198 B2 | * | 6/2006 | Hong et al. | 341/143 |
| 7,161,520 B2 | * | 1/2007 | Liu et al. | 341/155 |
| 7,304,483 B2 | * | 12/2007 | O'Dowd et al. | 324/658 |
| 7,683,815 B2 | * | 3/2010 | Josefsson et al. | 341/143 |
| 7,724,041 B2 | * | 5/2010 | Draxelmayr | 327/91 |

* cited by examiner

*Primary Examiner* — Kenneth B. Wells
(74) *Attorney, Agent, or Firm* — Litron Patent & Trademark Office; Ming-Lee Teng

(57) ABSTRACT

A capacitance interface circuit is provided. An external inductive capacitor is divided into a variable portion and an invariable portion. The capacitance of an internal adjustable capacitor is designed to be equal or close to the fixed capacitance of the external inductive capacitor. The internal adjustable capacitor is used for storing charges having a polarity opposite to that of the invariable portion of the external inductive capacitor in order to neutralize the effect of the invariable portion of the external inductive capacitor. Thus, a charge converter composed of a fully-differential amplifier and feedback capacitors needs only work on the variable portion of the external inductive capacitor, and accordingly the accuracy in subsequent data processing is increased.

8 Claims, 16 Drawing Sheets

CAPACITANCE INTERFACE CIRCUIT

CROSS-REFERENCE TO RELATED APPLICATION

This application is a continuation-in-part application of and claims the priority benefit of U.S. application Ser. No. 12/490,306, filed on Jun. 23, 2009, now pending, which claims the priority benefit of Taiwan application serial no. 98111490, filed on Apr. 7, 2009. This application also claims the priority benefits of Taiwan application serial no. 99118750, filed on Jun. 9, 2010. The entirety of each of the above-mentioned patent applications is hereby incorporated by reference herein and made a part of this specification.

BACKGROUND OF THE INVENTION

1. Field of the Invention

The present invention generally relates to an interface circuit, and more particularly, to a capacitance interface circuit.

2. Description of Related Art

FIG. 1 is a circuit diagram of a capacitance interface circuit 100 disclosed in U.S. Pat. No. 6,452,514. FIG. 2 is an operation timing diagram of the capacitance interface circuit 100 in FIG. 1. Referring to both FIG. 1 and FIG. 2, the capacitance interface circuit 100 includes a sampling switch 101, a reset switch 103, a control means 105, a measurement means 107, a charge cancellation means 109, a buffer B, and capacitors Ci and Cs. In the capacitance interface circuit 100, the capacitor Cs is first reset according to a reset signal RES. Then, the capacitor Ci is charged. Next, charges stored in the capacitor Ci are conducted/transferred into the capacitor Cs through charge pump means. Finally, the charges stored in the capacitor Cs are measured to determine the capacitance of the capacitor Ci.

It should be mentioned herein that the charges accumulated in the capacitor Cs form the output voltage Vout of the capacitance interface circuit 100. As shown in FIG. 2, the charges in the capacitor Cs are accumulated at each rising edge of a signal received at the end Tx of the capacitor Ci. The voltages $V_1$-$V_N$ corresponding to the charges accumulated by the capacitor Cs during each period (i.e., each rising edge can be considered as a period) have following values:

$$V_1 = Vp*Ci/(Ci+Cs);$$

$$V_2 = Vp*Ci/(Ci+Cs)*[1+Cs/(Ci+Cs)];$$

$$V_3 = Vp*Ci/(Ci+Cs)*\{1+Cs/(Ci+Cs)+[Cs/(Ci+Cs)]^2\};$$

$$V_4 = Vp*Ci/(Ci+Cs)*\{1+Cs/(Ci+Cs)+[Cs/(Ci+Cs)]^2 + [Cs/(Ci+Cs)]^3\};$$

... ; and $$V_N = Vp*Ci/(Ci+Cs)*\{1+Cs/(Ci+Cs)+[Cs/(Ci+Cs)]^2 + [Cs/(Ci+Cs)]^3 + ... + [Cs/(Ci+Cs)]^{(N-1)}\},$$

wherein Ci is the capacitance of the capacitor Ci; Cs is the capacitance of the capacitor Cs; and Vp is a positive reference voltage of the signal received at the end Tx of the capacitor Ci.

Accordingly, different amount of charges are accumulated by the capacitor Cs during each period (i.e., $(V_2-V_1)\neq(V_3-V_2)\neq(V_4-V_3)\neq ... \neq(V_N-V_{N-1})$). Thus, in order to make the capacitor Cs to accumulate the same or similar amount of charges during each period, the capacitance of the capacitor Cs has to be designed to be much greater than that of the capacitor Ci. However, such a design makes it difficult to dispose the capacitor Cs in an integrated circuit (IC).

SUMMARY OF THE INVENTION

The present invention provides a capacitance interface circuit including a first capacitor, four switches, two reset switches, two feedback capacitors, a fully-differential amplifier, a control unit, and an cancellation means. The two feedback capacitors are usually not very large therefore can be disposed in an integrated circuit (IC). The first capacitor is an external inductive capacitor, and which is divided into a variable portion and an invariable portion. The control unit generates at least two control signals and a reset signal to control the operations of all the switches and the cancellation means. The cancellation means cancels the invariable portion of the external inductive capacitor so that a charge converter composed of the fully-differential amplifier and the feedback capacitors needs only work on the variable portion of the external inductive capacitor and accordingly the accuracy in subsequent data processing is increased.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
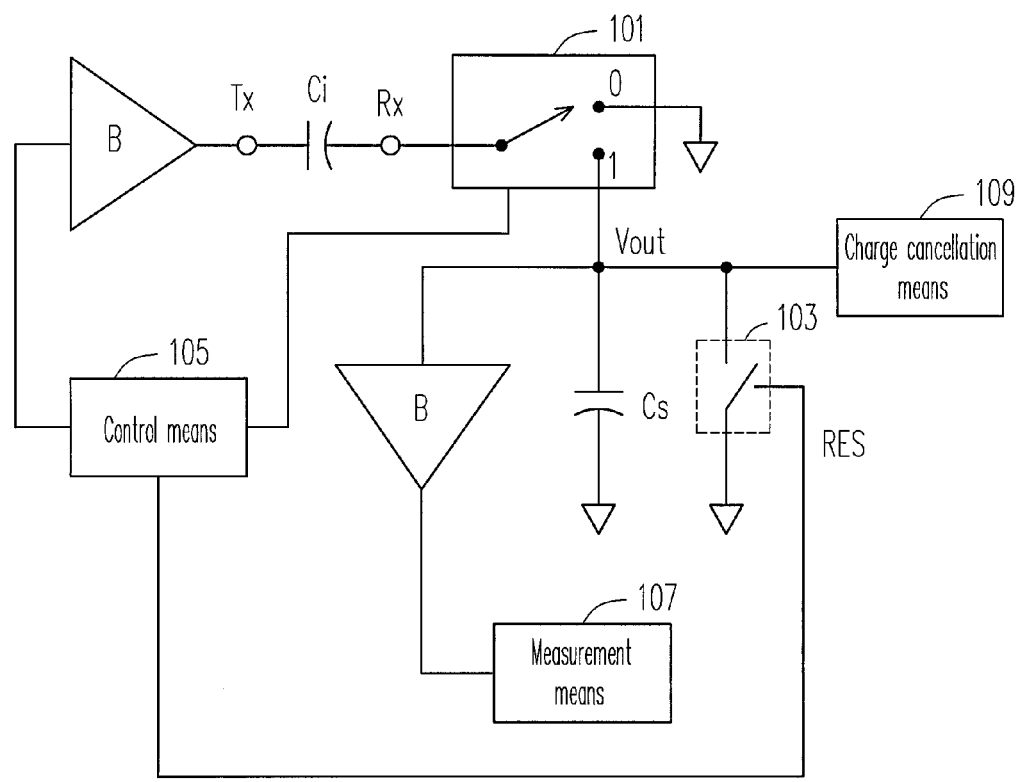
FIG. 1 is a circuit diagram of a capacitance interface circuit 100 disclosed in U.S. Pat. No. 6,452,514.
Figure 2:
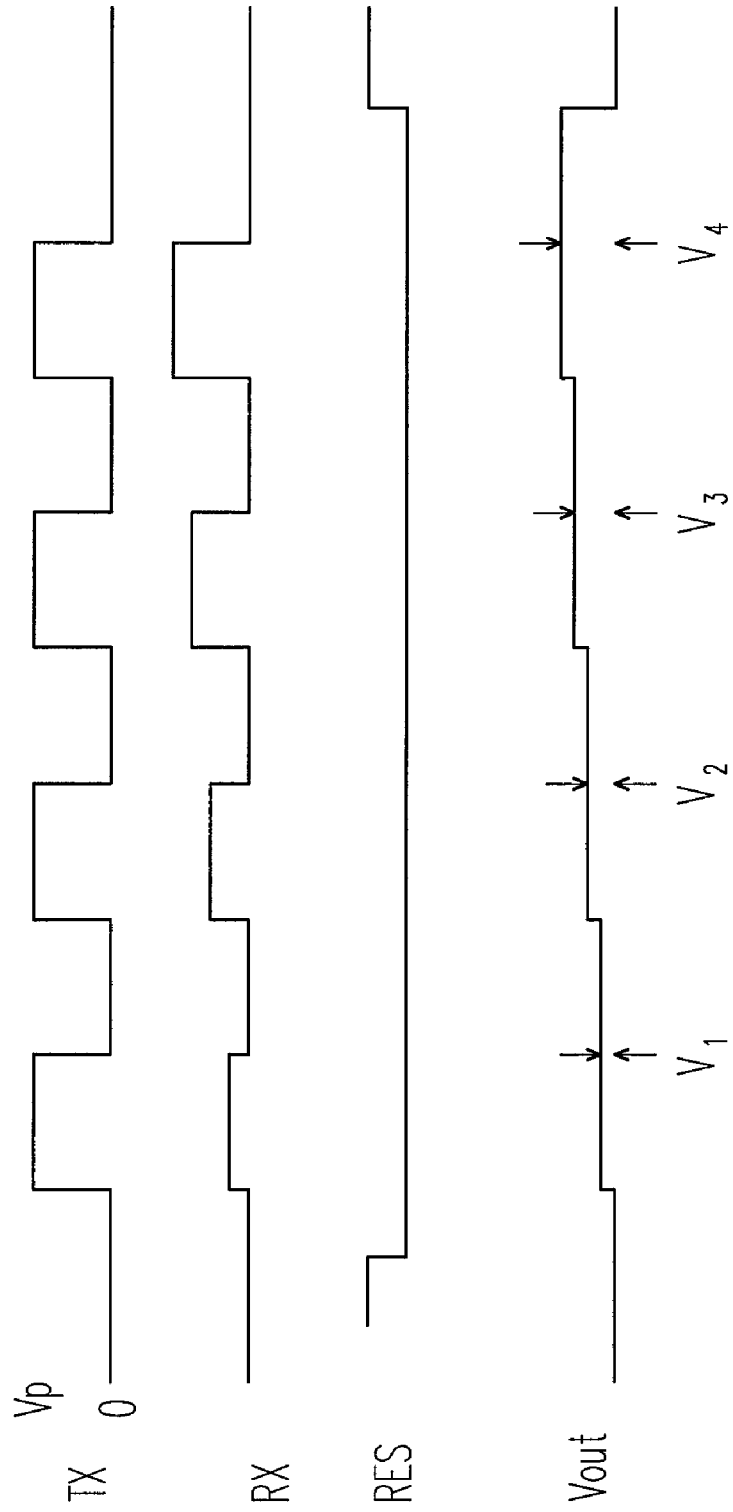
FIG. 2 is an operation timing diagram of the capacitance interface circuit 100 in FIG. 1.

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 3:
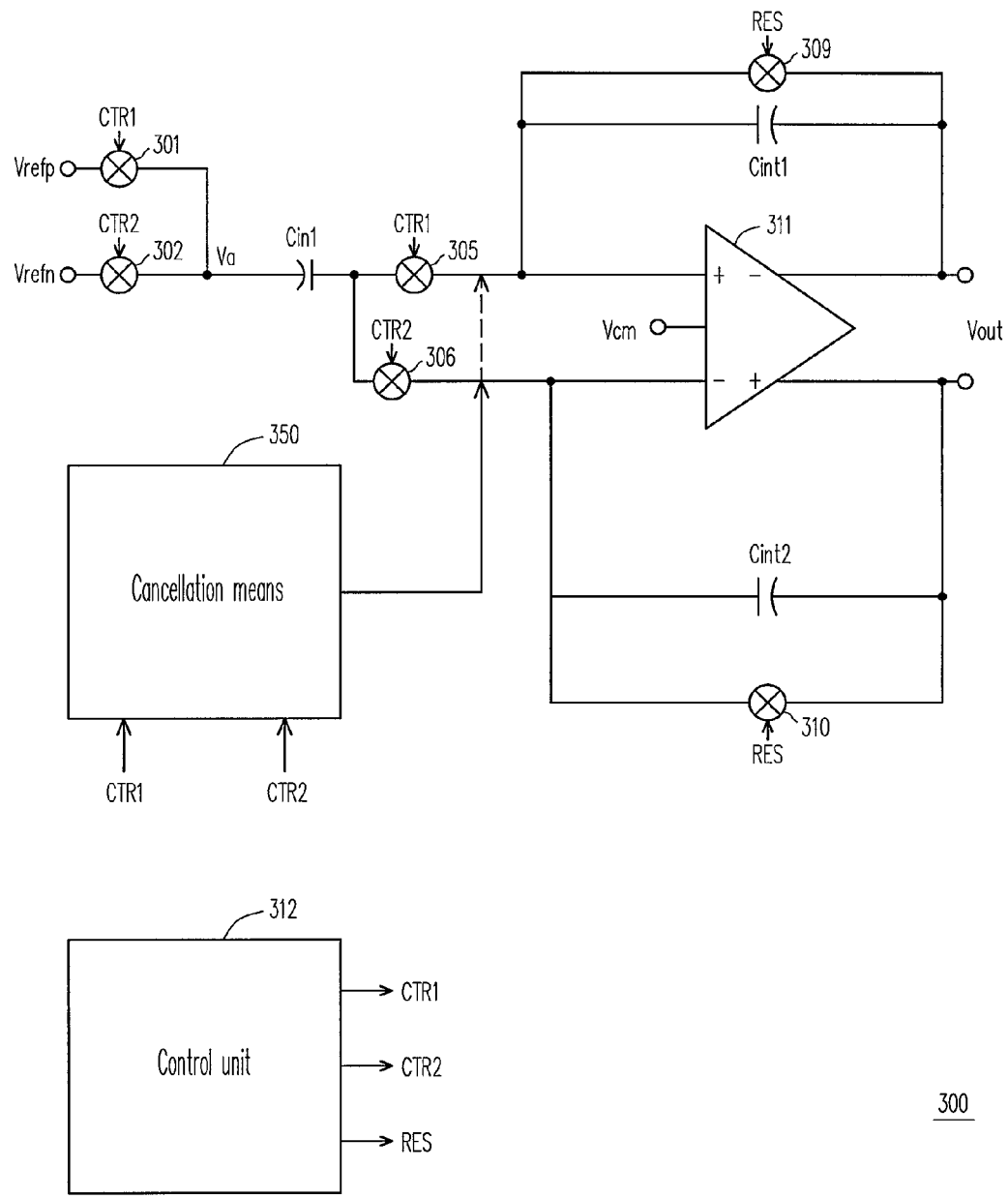
FIG. 3 is a circuit diagram of a capacitance interface circuit 300 according to a first embodiment of the present invention.

FIG. 3 is a circuit diagram of a capacitance interface circuit 300 according to the first embodiment of the present invention. Referring to FIG. 3, the capacitance interface circuit 300 includes a capacitor Cin1, four switches 301, 302, 305, and 306, two reset switches 309 and 310, two feedback capacitors Cint1 and Cint2, a fully-differential amplifier 311, a control unit 312, and a cancellation means 350. The feedback capacitors Cint1 and Cint2 are usually not very large therefore are suitable for being disposed in an integrated circuit (IC). The control unit 312 is suitable for generating control signals CTR1 and CTR2 and a reset signal RES so as to control the operations of the switches 301, 302, 305, 306, 309, and 310 and the cancellation means 350.

In the present embodiment, the capacitor Cin1 is an external inductive capacitor, and which is divided into a variable portion Cchg (will be described in detail below) and an invariable portion Cfix (will be described in detail below). The cancellation means 350 can cancel the invariable portion of the external inductive capacitor (i.e., the capacitor Cin1) so that a charge converter composed of the fully-differential amplifier 311 and the feedback capacitors Cint1 and Cint2 needs only work on the variable portion of the external inductive capacitor (i.e., the capacitor Cin1) and accordingly the accuracy in subsequent data processing is increased.

Second Embodiment

Figure 4:
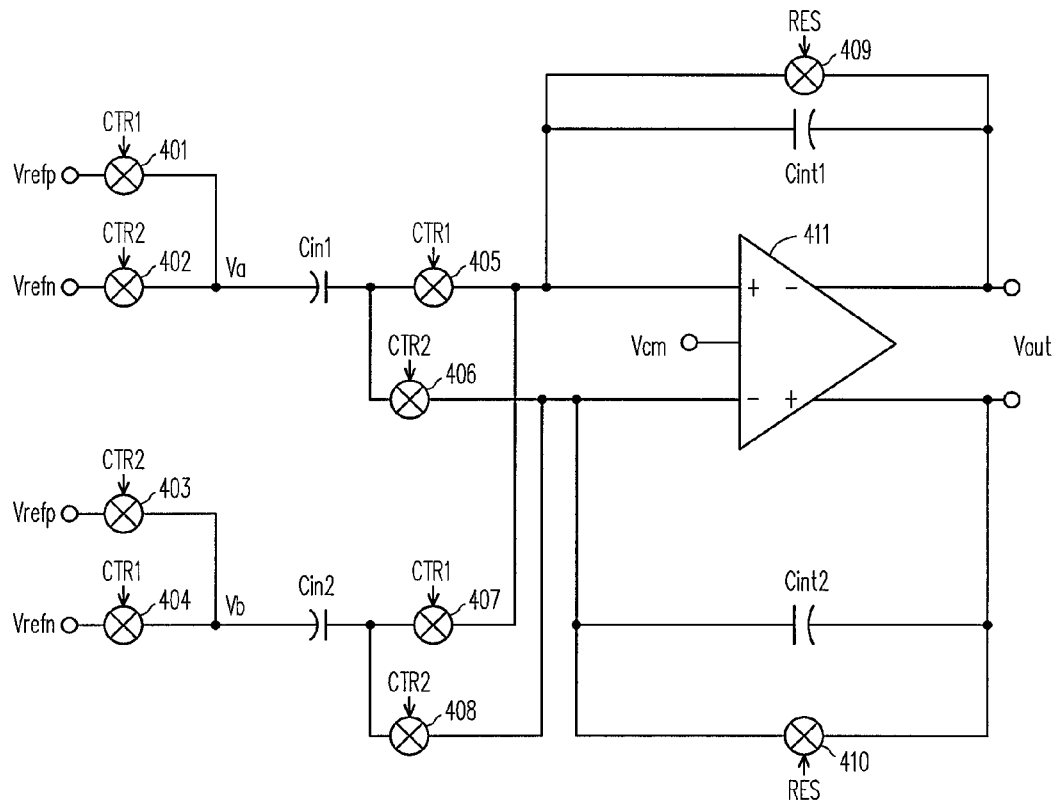
FIG. 4 is a circuit diagram of a capacitance interface circuit 400 according to a second embodiment of the present invention.
Figure 4:
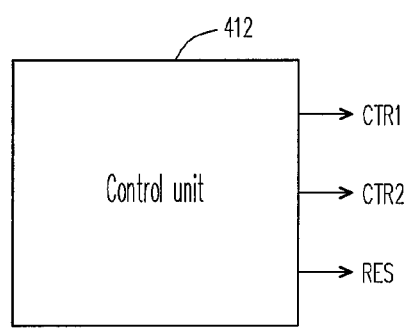

FIG. 4 is a circuit diagram of a capacitance interface circuit 400 according to the second embodiment of the present invention. Referring to FIG. 4, the capacitance interface circuit 400 includes capacitors Cin1 and Cin2, eight switches 401-408, two reset switches 409 and 410, two feedback capacitors Cint1 and Cint2 (which are usually not very large therefore can be disposed in an IC), a fully-differential amplifier 411, and a control unit 412. In the present embodiment, the first terminal of the switch 401 receives a positive reference voltage Vrefp, and the control terminal of the switch 401 receives a control signal CTR1. The first terminal of the switch 402 receives a negative reference voltage Vrefn, the second terminal of the switch 402 is coupled to the second terminal of the switch 401, and the control terminal of the switch 402 receives a control signal CTR2.

The first terminal of the capacitor Cin1 is coupled to the second terminal of the switch 402. The first terminal of the switch 403 receives the positive reference voltage Vrefp, and the control terminal of the switch 403 receives the control signal CTR2. The first terminal of the switch 404 receives the negative reference voltage Vrefn, the second terminal of the switch 404 is coupled to the second terminal of the switch 403, and the control terminal of the switch 404 receives the control signal CTR1. The first terminal of the capacitor Cin2 is coupled to the second terminal of the switch 404. The first terminal of the switch 405 is coupled to the second terminal of the capacitor Cin1, and the control terminal of the switch 405 receives the control signal CTR1. The first terminal of the switch 406 is coupled to the second terminal of the capacitor Cin1, and the control terminal of the switch 406 receives the control signal CTR2.

The first terminal of the switch 407 is coupled to the second terminal of the capacitor Cin2, and the control terminal of the switch 407 receives the control signal CTR1. The first terminal of the switch 408 is coupled to the second terminal of the capacitor Cin2, and the control terminal of the switch 408 receives the control signal CTR2. The positive input terminal of the fully-differential amplifier 411 is coupled to the second terminals of the switches 405 and 407, the negative input terminal of the fully-differential amplifier 411 is coupled to the second terminals of the switches 406 and 408, and the common mode receiving terminal of the fully-differential amplifier 411 receives a common mode voltage Vcm.

The first terminal of the feedback capacitor Cint1 is coupled to the second terminal of the switch 405, and the second terminal of the feedback capacitor Cint1 is coupled to the negative output terminal of the fully-differential amplifier 411. The first terminal of the reset switch 409 is coupled to the first terminal of the feedback capacitor Cint1, the second terminal of the reset switch 409 is coupled to the second terminal of the feedback capacitor Cint1, and the control terminal of the reset switch 409 receives the reset signal RES. The first terminal of the feedback capacitor Cint2 is coupled to the second terminal of the switch 406, and the second terminal of the feedback capacitor Cint2 is coupled to the positive output terminal of the fully-differential amplifier 411. The first terminal of the reset switch 410 is coupled to the first terminal of the feedback capacitor Cint2, the second terminal of the reset switch 410 is coupled to the second terminal of the feedback capacitor Cint2, and the control terminal of the reset switch 410 receives the reset signal RES.

Figure 5:
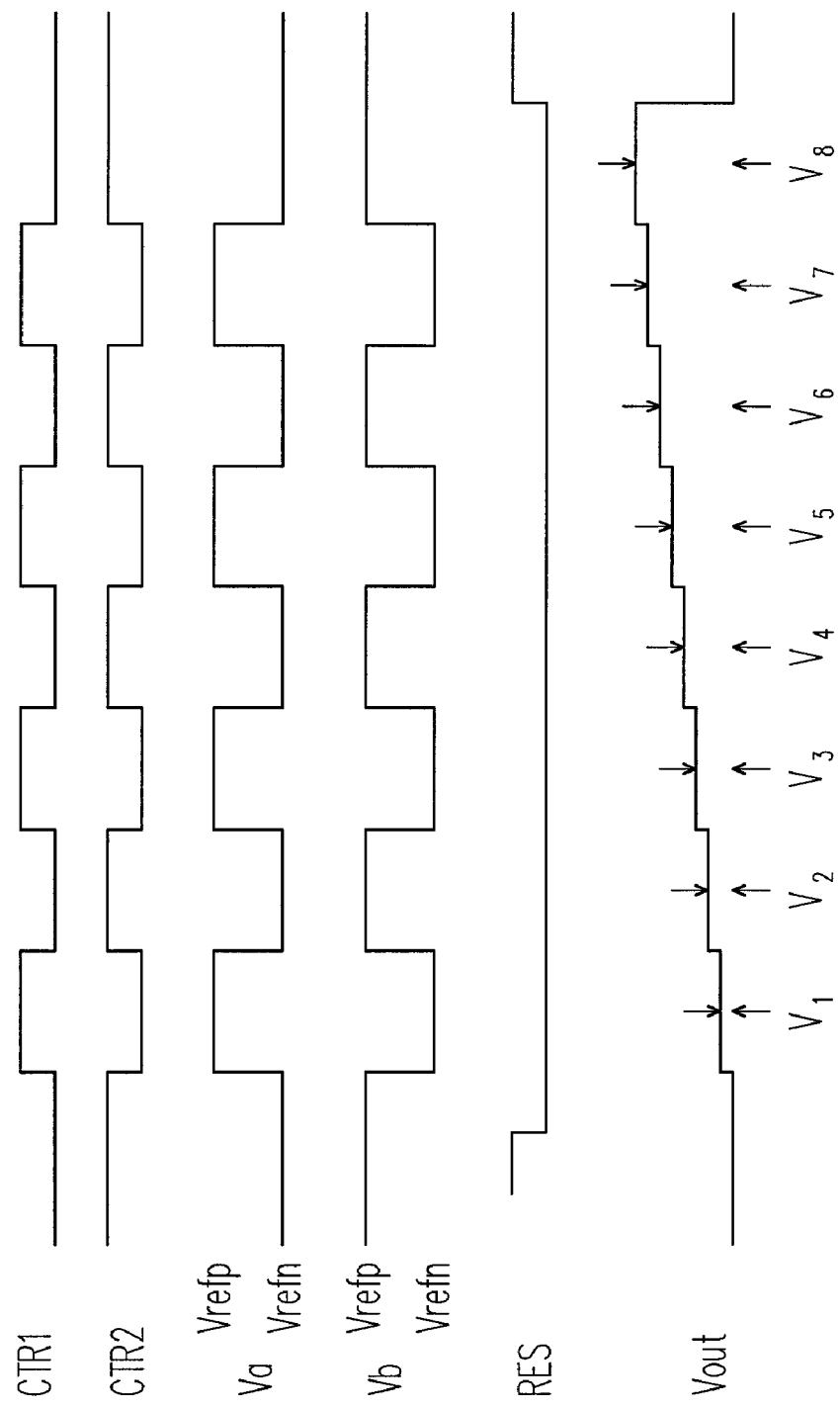
FIG. 5 is an operation timing diagram of the capacitance interface circuit 400 in FIG. 4.

In the present embodiment, the control signals CTR1 and CTR2 and the reset signal RES are generated by the control unit 412. To be specific, FIG. 5 is an operation timing diagram of the capacitance interface circuit 400 in FIG. 4. Referring to both FIG. 4 and FIG. 5, the control unit 412 is coupled to the control terminals of the switches 401-408 and the reset switches 409 and 410 for generating the control signals CTR1 and CTR2 and the reset signal RES and controlling the operations of the switches 401-408 and the reset switches 409 and 410. Herein the control signals CTR1 and CTR2 have a phase difference of 180°.

As shown in FIG. 5, the voltage on the node Va in FIG. 4 is alternatively the positive reference voltage Vrefp and the negative reference voltage Vrefn in response to the control signal CTR1. Similarly, the voltage on the node Vb in FIG. 4 is alternatively the negative reference voltage Vrefn and the positive reference voltage Vrefp in response to the control signal CTR2. In the present embodiment, the switches 401, 404, 405, and 407 are turned on when the control signal CTR1 is enabled and turned off when the control signal CTR1 is disabled. Similarly, the switches 402, 403, 406, and 408 are turned on when the control signal CTR2 is enabled and turned off when the control signal CTR2 is disabled. Besides, the reset switches 409 and 410 are turned on when the reset signal RES is enabled and turned off when the reset signal RES is disabled.

As described above, if the capacitors Cin1 and Cin2 are respectively an external inductive capacitor of the capacitance interface circuit 400 and the capacitances of the feedback capacitors Cint1 and Cint2 are both Cint, the output voltage Vout of the capacitance interface circuit 400 is in direct ratio to the capacitance difference between the capacitors Cin1 and Cin2.

To be specific, the feedback capacitors Cint1 and Cint2 accumulate charges at each rising/falling edge of the control signals CTR1 and CTR2, and the voltages $V_1$-$V_N$ corresponding to the charges accumulated by the feedback capacitors Cint1 and Cint2 during each period (i.e., each rising/falling edge can be considered a period) have following values:

$$V_1 = 1*(Vrefp - Vrefn)*(Cin1 - Cin2)/Cint;$$

$$V_2 = 2*(Vrefp - Vrefn)*(Cin1 - Cin2)/Cint;$$

$$V_3 = 3*(Vrefp - Vrefn)*(Cin1 - Cin2)/Cint;$$

... ; and $$V_N = N*(Vrefp - Vrefn)*(Cin1 - Cin2)/Cint,$$

wherein the charges accumulated by the feedback capacitors Cint1 and Cint2 during each period have the same or very similar values since the capacitances of the feedback capacitors Cint1 and Cint2 are both Cint. Namely, there is:

$$(V_2 - V_1) = (V_3 - V_2) = (V_4 - V_3) = \ldots = (V_N - V_{N-1}), \text{ or}$$

$$(V_2 - V_1) \approx (V_3 - V_2) \approx (V_4 - V_3) \approx \ldots \approx (V_N - V_{N-1}).$$

Assuming that the capacitor Cin1 has a variable portion Cchg1 and an invariable portion Cfix1 and the capacitor Cin2 has a variable portion Cchg2 and an invariable portion Cfix2, then there is (Cin1−Cin2)=(Cchg1−Cchg2)+(Cfix1−Cfix2). Accordingly, the invariable portions Cfix1 are Cfix2 cancel each other out.

It can be understood based on forgoing description that charges having a polarity opposite to that of the external inductive capacitor Cin1 are stored in the external inductive capacitor Cin2 for cancelling the effect of the invariable portion, so that the charge converter composed of the fully-differential amplifier 411 and the feedback capacitors Cint1 and Cint2 needs only work on the variable portions of the capacitors Cin1 and Cin2 and accordingly the accuracy in subsequent data processing is increased.

On the other hand, assuming that the capacitor Cin1 is an external inductive capacitor of the capacitance interface circuit 400, the capacitor Cin2 is an internal adjustable capacitor (for example, a variable capacitor; however, the present invention is not limited thereto) of the capacitance interface circuit 400, and the capacitances of the feedback capacitors Cint1 and Cint2 are both Cint, the capacitance of the capacitor Cin1 can be divided into a fixed capacitance Cfix1 and a variable capacitance Cchg1 (i.e., Cin1=Cfix1+Cchg1). Herein the fixed capacitance Cfix1 can be considered as a fixed value within a short period since it only slowly changes along with some external environmental factors (for example, temperature, humidity, and pressure, etc).

When the fully-differential amplifier 411 is not saturated (i.e., the fully-differential amplifier 411 operates within a linear region), a random/approximate capacitance Cin2' is preset such that there is Cchg'=Cin1−Cin2'=Cfix1+Cchg1−Cin2'. Herein an inaccurate value of Cchg' is obtained. If Cchg' is only slowly and slightly changed during a long time, it can be considered as a portion of the fixed capacitance Cfix1 and merged into the capacitor Cin2. Thus, the capacitor Cin2 satisfies Cin2=Cin2'+Cchg'=Cin2'+(Cin1−Cin2')=Cin1, and herein it is considered that Cchg=0 and Cin2=Cin1=Cfix1. Accordingly, the capacitance of the capacitor Cin2 is substantially equal or close to the fixed capacitance Cfix1. Namely, Cchg' obtained with Cchg=0 can be used for adjusting the capacitance of the capacitor Cin2. In addition, the capacitance of the capacitor Cin2 is equal or close to the invariable portion Cfix1 when Cchg' is equal or close to 0.

Once the capacitance of the capacitor Cin2 is substantially equal or close to the fixed capacitance Cfix1, the output voltage Vout of the capacitance interface circuit 400 is in direct ratio to the variable capacitance Cchg1. Accordingly, the voltages $V_1$-$V_N$ corresponding to the charges accumulated by the capacitors Cint1 and Cint2 during each period (each rising/falling edge can be considered as a period) have following values:

$$V_1 = 1*(Vrefp - Vrefn)*Cchg1/Cint;$$

$$V_2 = 2*(Vrefp - Vrefn)*Cchg1/Cint;$$

$$V_3 = 3*(Vrefp - Vrefn)*Cchg1/Cint;$$

... ; and $$V_N = N*(Vrefp - Vrefn)*Cchg1/Cint.$$

Accordingly, the charges accumulated by the feedback capacitors Cint1 and Cint2 during each period have also the same or very similar values. Namely, there is:

$$(V_2 - V_1) = (V_3 - V_2) = (V_4 - V_3) = \ldots = (V_N - V_{N-1}), \text{ or}$$

$$(V_2 - V_1) \approx (V_3 - V_2) \approx (V_4 - V_3) \approx \ldots \approx (V_N - V_{N-1}).$$

According to foregoing description, when the capacitance of the internal adjustable capacitor Cin2 is designed to be the same as or close to the fixed capacitance Cfix1 of the external inductive capacitor Cin1 and charges having a polarity opposite to that of the capacitor Cin1 are stored in the capacitor Cin2 for neutralizing the effect of the invariable portion of the capacitor Cin1, the charge converter composed of the fully-differential amplifier 411 and the feedback capacitors Cint1 and Cint2 needs only work on the variable portion of the capacitor Cin1, so that the accuracy in subsequent data processing is increased.

Third Embodiment

Figure 6:
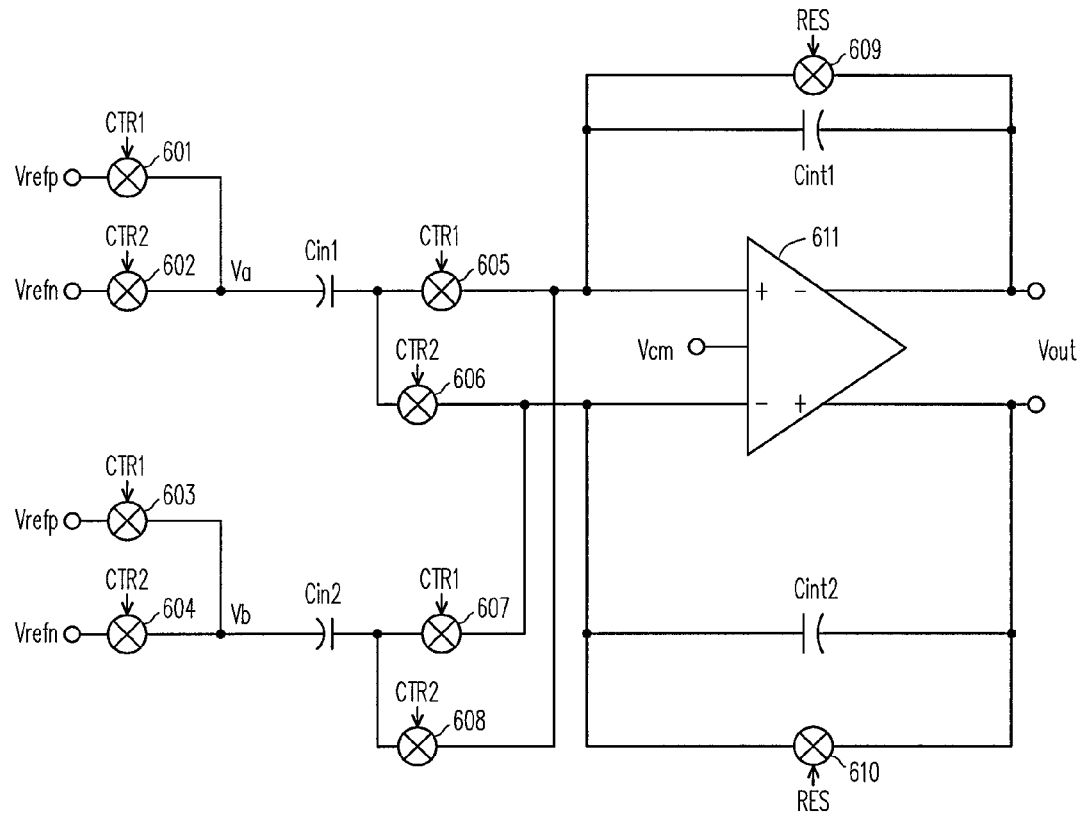
FIG. 6 is a circuit diagram of a capacitance interface circuit 600 according to a third embodiment of the present invention.

FIG. 6 is a circuit diagram of a capacitance interface circuit 600 according to the third embodiment of the present invention. Referring to both FIG. 4 and FIG. 6, elements similar to those of the capacitance interface circuit 400 are denoted with similar reference numerals in FIG. 6. It should be noted that the control terminal of the switch 403 receives the control signal CTR2, and the control terminal of the switch 404 receives the control signal CTR1. The control terminal of the switch 603 receives the control signal CTR1, and the control terminal of the switch 604 receives the control signal CTR2. The second terminal of the switch 407 is coupled to the second terminal of the switch 405, and the second terminal of the switch 408 is coupled to the second terminal of the switch 406. The second terminal of the switch 607 is coupled to the second terminal of the switch 606, and the second terminal of the switch 608 is coupled to the second terminal of the switch 605.

Figure 7:
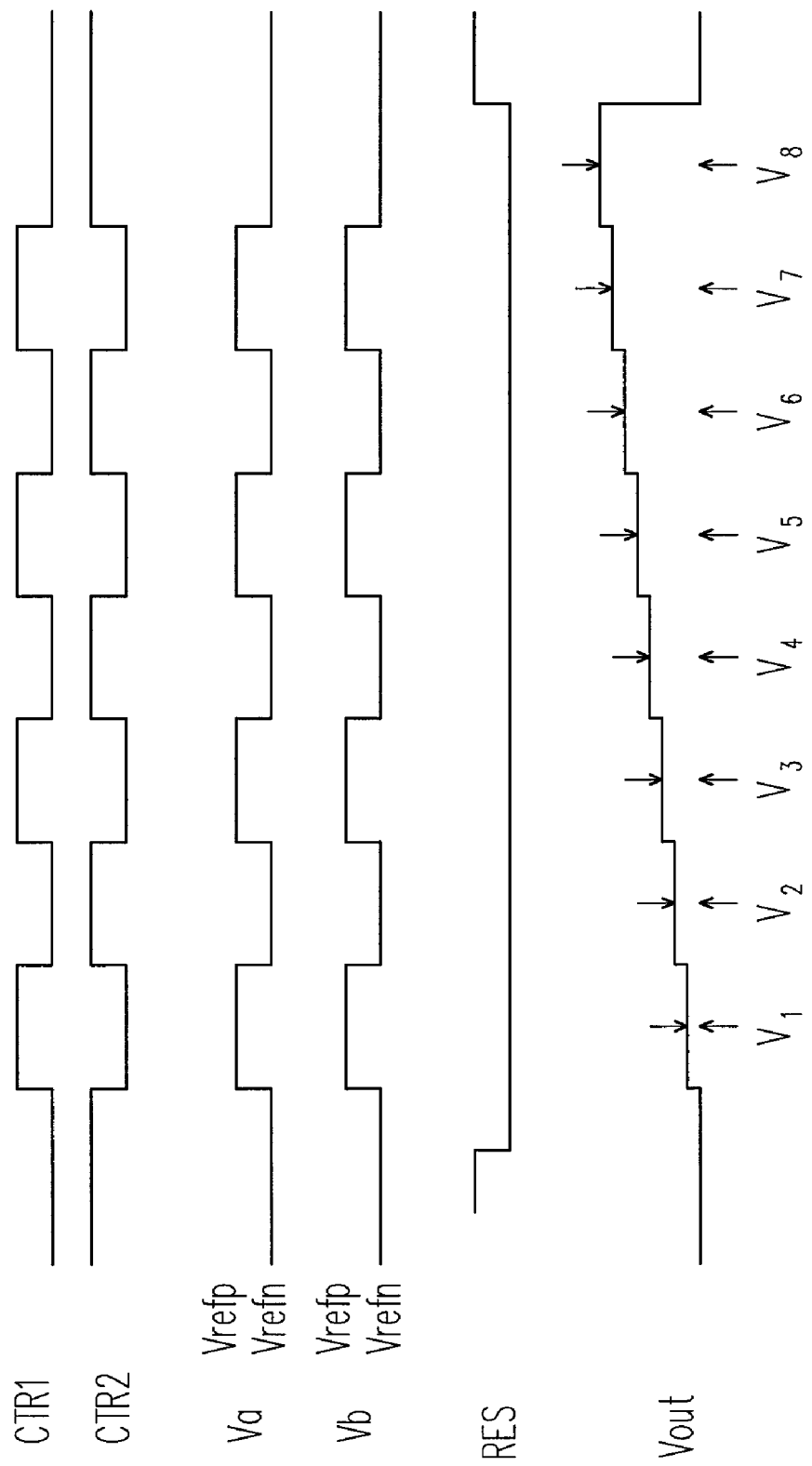
FIG. 7 is an operation timing diagram of the capacitance interface circuit 600 in FIG. 6.

FIG. 7 is an operation timing diagram of the capacitance interface circuit 600 in FIG. 6. Referring to both FIG. 6 and FIG. 7, the control unit 612 is coupled to the control terminals of the switches 601-608 and the reset switches 609 and 610, and which generates the control signals CTR1 and CTR2 and the reset signal RES to control the operations of the switches 601-608 and the reset switches 609 and 610.

As described above, assuming that the capacitors Cin1 and Cin2 are respectively an external inductive capacitor of the capacitance interface circuit 400 and the capacitances of the feedback capacitors Cint1 and Cint2 (each rising/falling edge can be considered as a period), the output voltage Vout of the capacitance interface circuit 400 is then in direct ratio to the capacitance difference between the capacitors Cin1 and Cin2.

To be specific, the capacitors Cint1 and Cint2 accumulate charges at each rising/falling edge of the control signals CTR1 and CTR2, and the $V_1$–$V_N$ corresponding to the charges accumulated by the capacitors Cint1 and Cint2 during each period (each rising/falling edge can be considered as a period) have following values:

$$V_1 = 1*(Vrefp - Vrefn)*(Cin1 - Cin2)/Cint;$$

$$V_2 = 2*(Vrefp - Vrefn)*(Cin1 - Cin2)/Cint;$$

$$V_3 = 3*(Vrefp - Vrefn)*(Cin1 - Cin2)/Cint;$$

$$\ldots; \text{and}$$

$$V_N = N*(Vrefp - Vrefn)*(Cin1 - Cin2)/Cint,$$

wherein the charges accumulated by the feedback capacitors Cint1 and Cint2 during each period have the same or very similar values since the capacitances of the feedback capacitors Cint1 and Cint2 are both Cint. Namely, there is:

$$(V_2 - V_1) = (V_3 - V_2) = (V_4 - V_3) = \ldots = (V_N - V_{N-1}) \text{ or}$$

$$(V_2 - V_1) \approx (V_3 - V_2) \approx (V_4 - V_3) \approx \ldots \approx (V_N - V_{N-1}).$$

Assuming that the capacitor Cin1 has a variable portion Cchg1 and an invariable portion Cfix1 and the capacitor Cin2 has a variable portion Cchg2 and an invariable portion Cfix2, then there is (Cin1−Cin2)=(Cchg1−Cchg2)+(Cfix1−Cfix2). Accordingly, the invariable portions Cfix1 and Cfix2 can cancel each other out.

Based on foregoing description, when the external inductive capacitor Cin2 stores charges having the same polarity as that of the external inductive capacitor Cin1 and the fully-differential amplifier 611 cancels the effect of the invariable portions (because the second terminals of the switches 607 and 608 are coupled differently as those of the switches 407 and 408), the charge converter composed of the fully-differential amplifier 611 and the feedback capacitors Cint1 and Cint2 needs only work on the variable portions of the capacitors Cin1 and Cin2, so that the accuracy in subsequent data processing is increased.

On the other hand, assuming that the capacitor Cin1 is an external inductive capacitor of the capacitance interface circuit 400, the capacitor Cin2 is an internal adjustable capacitor (for example, a variable capacitor; however, the present invention is not limited thereto) of the capacitance interface circuit 400, and the capacitances of the feedback capacitors Cint1 and Cint2 are both Cint, the capacitance of the capacitor Cin1 is divided into a fixed capacitance Cfix1 and a variable capacitance Cchg1 (i.e., Cin1=Cfix1+Cchg1). Herein the fixed capacitance Cfix1 can be considered as a fixed value during a short period since it only changes along with some external environmental factors (for example, temperature, humidity, and pressure, etc).

When the fully-differential amplifier 611 is not saturated, a random/approximate capacitance Cin2' is preset such that there is Cchg'=Cin1−Cin2'=Cfix1+Cchg1−Cin2'. Herein an inaccurate Cchg' is obtained. When Cchg' only slowly and slightly changes during a long time, it can be considered as a portion of the fixed capacitance Cfix1 and merged into the capacitor Cin2. Thus, the capacitor Cin2 satisfies Cin2=Cin2'+Cchg'=Cin2'+(Cin1−Cin2')=Cin1, and herein it is considered that Cchg=0 and Cin2=Cin1=Cfix1. Accordingly, the capacitance of the capacitor Cin2 is substantially equal or close to the fixed capacitance Cfix1. Namely, Cchg' obtained with Cchg=0 can be used for adjusting the capacitance of the capacitor Cin2. Besides, the capacitance of the capacitor Cin2 is equal or close to the fixed capacitance Cfix1 when Cchg' is equal or close to 0.

According to foregoing description, when the capacitance of the internal adjustable capacitor Cin2 is designed to be the same as or close to the fixed capacitance Cfix1 of the external inductive capacitor Cin1 and the capacitor Cin2 stores charges having a polarity same to that of the capacitor Cin1, the effect of the invariable portion (because the second terminals of the switches 607 and 608 are coupled differently as those of the switches 407 and 408) of the capacitor Cin1 can be cancelled by the fully-differential amplifier 611, so that the charge converter composed of the fully-differential amplifier 611 and the feedback capacitors Cint1 and Cint2 needs only work on the variable portion of the capacitor Cin1 and accordingly the accuracy in subsequent data processing is increased.

Fourth Embodiment

Figure 8:
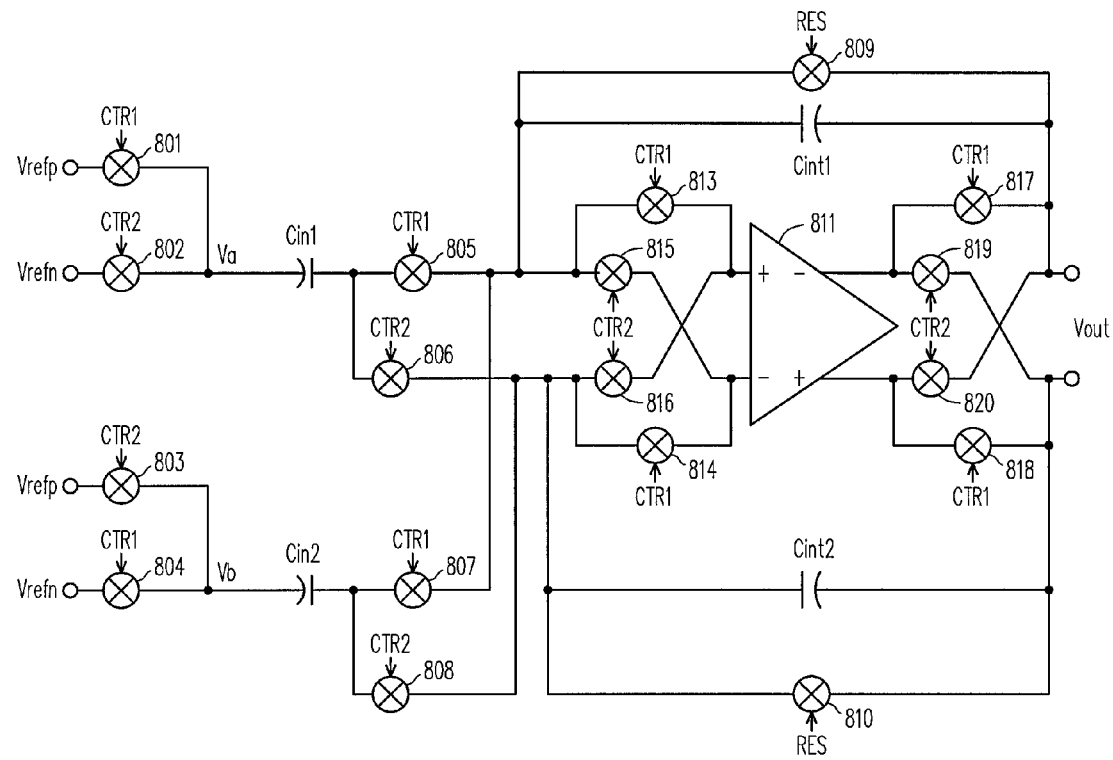
FIG. 8 is a circuit diagram of a capacitance interface circuit 800 according to a fourth embodiment of the present invention.
Figure 8:
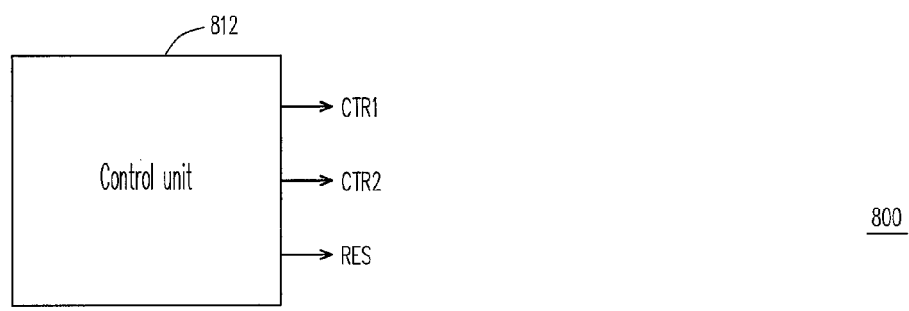

FIG. 8 is a circuit diagram of a capacitance interface circuit 800 according to the fourth embodiment of the present invention. Referring to both FIG. 4 and FIG. 8, elements similar to those of the capacitance interface circuit 400 are denoted with similar reference numerals in FIG. 8. The difference between the capacitance interface circuits 800 and 400 is that the capacitance interface circuit 800 has another eight switches 813-820 which form a chopper stabilization circuit. The first terminal of the switch 813 is coupled to the second terminal of the switch 805, the second terminal of the switch 813 is coupled to the positive input terminal of the fully-differential amplifier 811, and the control terminal of the switch 813 receives the control signal CTR1. The first terminal of the switch 814 is coupled to the second terminal of the switch 806, the second terminal of the switch 814 is coupled to the negative input terminal of the fully-differential amplifier 811, and the control terminal of the switch 814 receives the control signal CTR1.

The first terminal of the switch 815 is coupled to the second terminal of the switch 805, the second terminal of the switch 815 is coupled to the second terminal of the switch 814, and the control terminal of the switch 815 receives the control signal CTR2. The first terminal of the switch 816 is coupled to the second terminal of the switch 806, the second terminal of the switch 816 is coupled to the second terminal of the switch 813, and the control terminal of the switch 816 receives the control signal CTR2. The first terminal of the switch 817 is coupled to the negative output terminal of the fully-differential amplifier 811, the second terminal of the switch 817 is coupled to the second terminal of the feedback capacitor Cint1, and the control terminal of the switch 817 receives the control signal CTR1.

The first terminal of the switch 818 is coupled to the positive output terminal of the fully-differential amplifier 811, the second terminal of the switch 818 is coupled to the second terminal of the feedback capacitor Cint2, and the control terminal of the switch 818 receives the control signal CTR1. The first terminal of the switch 819 is coupled to the first terminal of the switch 817, the second terminal of the switch 819 is coupled to the second terminal of the switch 818, and the control terminal of the switch 819 receives the control signal CTR2. The first terminal of the switch 820 is coupled to the first terminal of the switch 818, the second terminal of the switch 820 is coupled to the second terminal of the switch 817, and the control terminal of the switch 820 receives the control signal CTR2.

In the present embodiment, the operation and function of the capacitance interface circuit 800 are similar to those of the capacitance interface circuit 400 therefore will not be described herein. In addition, because the chopper stabilization circuit composed of the switches 813-820 eliminates not only the offset error but also the flicker noise of the fully-differential amplifier 811, the capacitance interface circuit 800 is more stably and accurate than the capacitance interface circuit 400.

Fifth Embodiment

Figure 9:
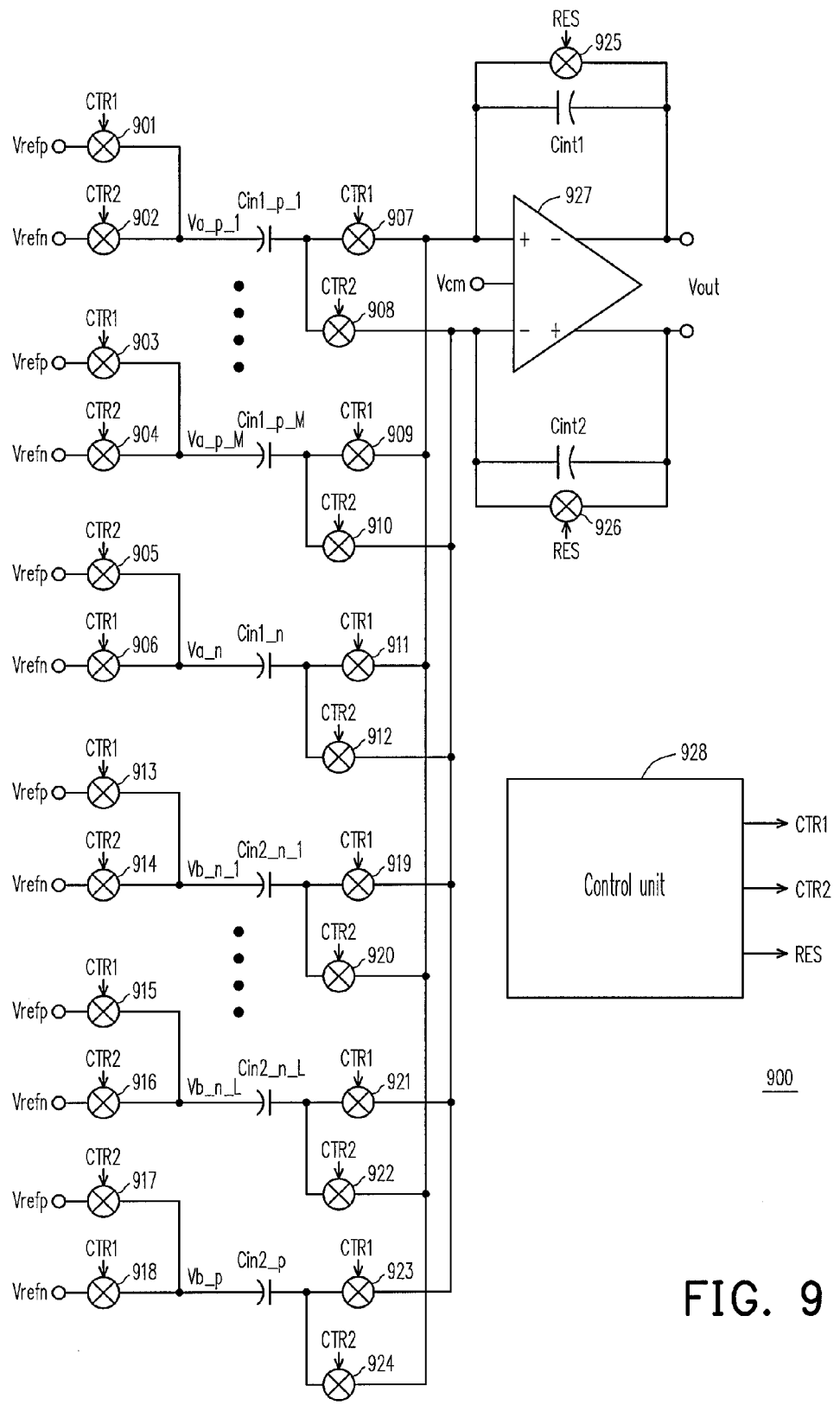
FIG. 9 is a circuit diagram of a capacitance interface circuit 900 according to a fifth embodiment of the present invention.

FIG. 9 is a circuit diagram of a capacitance interface circuit 900 according to the fifth embodiment of the present invention. Referring to FIG. 9, the capacitance interface circuit 900 includes capacitors Cin1_p_x (x=1, ..., and M, wherein M is a positive integer), Cin1_n, Cin2_n_k (k=1, L, wherein L is a positive integer), and Cin2_p, switches 901-924, two reset switches 925 and 926, two feedback capacitors Cint1 and Cint2, a fully-differential amplifier 927, and a control unit 928. In the present embodiment, the first terminal of the switch 901 receives the positive reference voltage Vrefp, and the control terminal of the switch 901 receives the control signal CTR1. The first terminal of the switch 902 receives the negative reference voltage Vrefn, the second terminal of the switch 902 is coupled to the second terminal of the switch 901, and the control terminal of the switch 902 receives the control signal CTR2. The first terminal of the capacitor Cin1_p_1 is coupled to the second terminal of the switch 902.

As to x=M, the first terminal of the switch 903 receives the positive reference voltage Vrefp, and the control terminal of the switch 903 receives the control signal CTR1. The first terminal of the switch 904 receives the negative reference voltage Vrefn, the second terminal of the switch 904 is coupled to the second terminal of the switch 903, and the control terminal of the switch 904 receives the control signal CTR2. The first terminal of the capacitor Cin1_p_M is coupled to the second terminal of the switch 904.

The first terminal of the switch 905 receives the positive reference voltage Vrefp, and the control terminal of the switch 905 receives the control signal CTR2. The first terminal of the switch 906 receives the negative reference voltage Vrefn, the second terminal of the switch 906 is coupled to the second terminal of the switch 905, and the control terminal of the switch 906 receives the control signal CTR1. The first terminal of the capacitor Cin1_n is coupled to the second terminal of the switch 906.

The first terminal of the switch 907 is coupled to the second terminal of the capacitor Cin1_p_1, and the control terminal of the switch 907 receives the control signal CTR1. The first terminal of the switch 908 is coupled to the second terminal of the capacitor Cin1_p_1, and the control terminal of the switch 908 receives the control signal CTR2. As to x=M, the first terminal of the switch 909 is coupled to the second terminal of the capacitor Cin1_p_M, and the control terminal of the switch 909 receives the control signal CTR1. The first terminal of the switch 910 is coupled to the second terminal of the capacitor Cin1_p_M, and the control terminal of the switch 910 receives the control signal CTR2. The first terminal of the switch 911 is coupled to the second terminal of the capacitor Cin1_n, and the control terminal of the switch 911 receives the control signal CTR1. The first terminal of the switch 912 is coupled to the second terminal of the capacitor Cin1_n, and the control terminal of the switch 912 receives the control signal CTR2.

The first terminal of the switch 913 receives the positive reference voltage Vrefp, and the control terminal of the switch 913 receives the control signal CTR1. The first terminal of the switch 914 receives the negative reference voltage Vrefn, the second terminal of the switch 914 is coupled to the second terminal of the switch 913, and the control terminal of the switch 914 receives the control signal CTR2. The first terminal of the capacitor Cin2_n_1 is coupled to the second terminal of the switch 914.

As to k=L, the first terminal of the switch 915 receives the positive reference voltage Vrefp, and the control terminal of the switch 915 receives the control signal CTR1. The first terminal of the switch 916 receives the negative reference voltage Vrefn, the second terminal of the switch 916 is coupled to the second terminal of the switch 915, and the control terminal of the switch 916 receives the control signal CTR2. The first terminal of the capacitor Cin2_n_L is coupled to the second terminal of the switch 916.

The first terminal of the switch 917 receives the positive reference voltage Vrefp, and the control terminal of the switch 917 receives the control signal CTR2. The first terminal of the switch 918 receives the negative reference voltage Vrefn, the second terminal of the switch 918 is coupled to the second terminal of the switch 917, and the control terminal of the switch 918 receives the control signal CTR1. The first terminal of the capacitor Cin2_p is coupled to the second terminal of the switch 918.

The first terminal of the switch 919 is coupled to the second terminal of the capacitor Cin2_n_1, and the control terminal of the switch 919 receives the control signal CTR1. The first terminal of the switch 920 is coupled to the second terminal of the capacitor Cin2_n_1, and the control terminal of the switch 920 receives the control signal CTR2. As to k=L, the first terminal of the switch 921 is coupled to the second terminal of the capacitor Cin2_n_L, and the control terminal of the switch 921 receives the control signal CTR1. The first terminal of the switch 922 is coupled to the second terminal of the capacitor Cin2_n_L, and the control terminal of the switch 922 receives the control signal CTR2. The first terminal of the switch 923 is coupled to the second terminal of the capacitor Cin2_p, and the control terminal of the switch 923 receives the control signal CTR1. The first terminal of the switch 924 is coupled to the second terminal of the capacitor Cin2_p, and the control terminal of the switch 927 receives the control signal CTR2.

The positive input terminal of the fully-differential amplifier 927 is coupled to the second terminals of the switches 907, 909, 911, 920, 922, and 924, the negative input terminal of the fully-differential amplifier 927 is coupled to the second terminals of the switches 908, 910, 912, 919, 921, and 923, and the common mode receiving terminal of the fully-differential amplifier 927 receives a common mode voltage Vcm. The first terminal of the feedback capacitor Cint1 is coupled to the second terminal of the switch 907, and the second terminal of the feedback capacitor Cint1 is coupled to the negative output terminal of the fully-differential amplifier 927. The first terminal of the reset switch 925 is coupled to the first terminal of the feedback capacitor Cint1, the second terminal of the reset switch 925 is coupled to the second terminal of the feedback capacitor Cint1, and the control terminal of the reset switch 925 receives the reset signal RES. The first terminal of the feedback capacitor Cint2 is coupled to the second terminal of the switch 908, and the second terminal of the feedback capacitor Cint2 is coupled to the positive output terminal of the fully-differential amplifier 927. The first terminal of the reset switch 926 is coupled to the first terminal of the feedback capacitor Cint2, the second terminal of the reset switch 926 is coupled to the second terminal of the feedback capacitor Cint2, and the control terminal of the reset switch 926 receives the reset signal RES.

Figure 10:
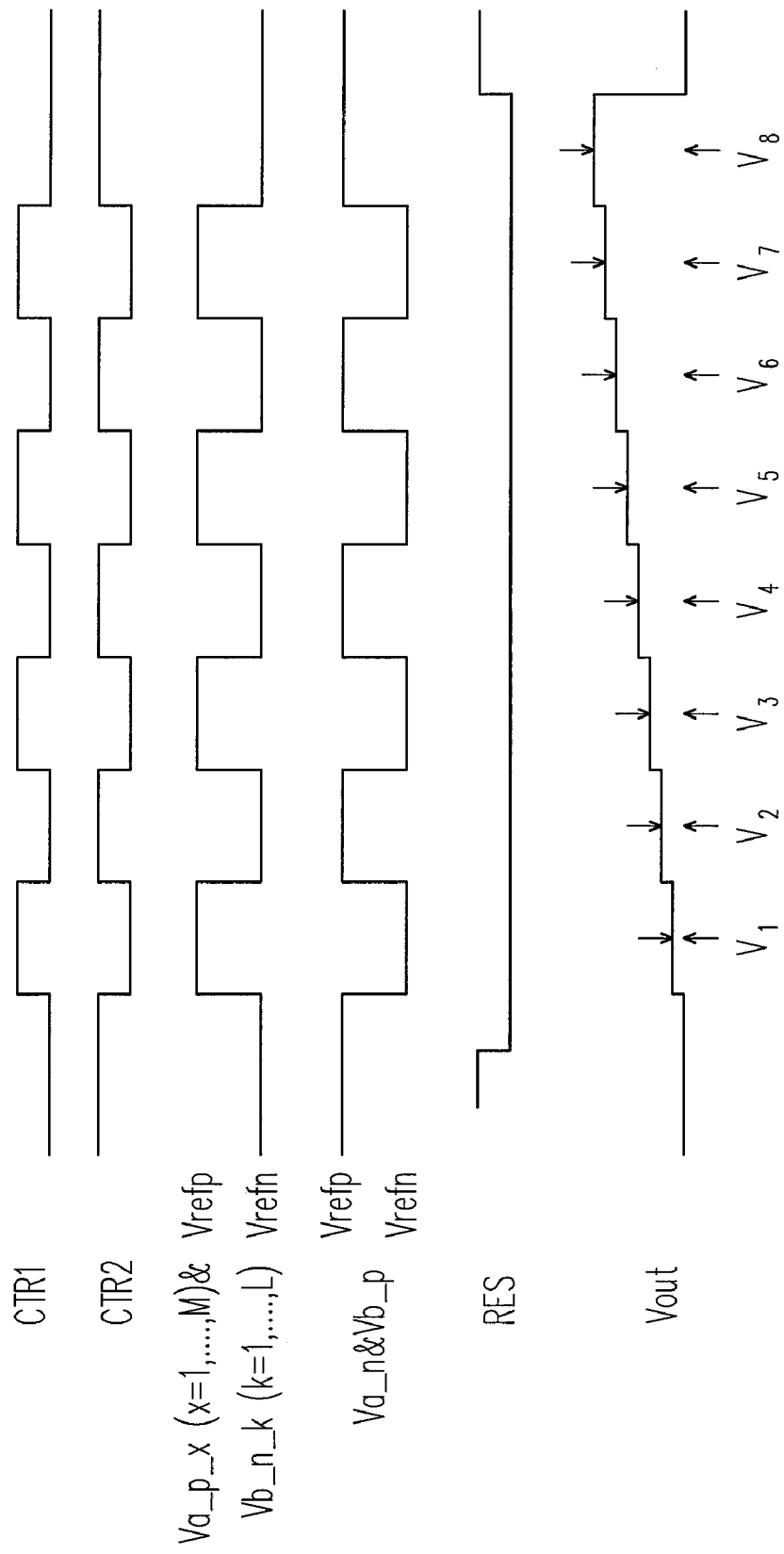
FIG. 10 is an operation timing diagram of the capacitance interface circuit 900 in FIG. 9.

In the present embodiment, the control signals CTRL and CTR2 and the reset signal RES are generated by the control unit 928. To be specific, FIG. 10 is an operation timing diagram of the capacitance interface circuit 900 in FIG. 9. Referring to both FIG. 9 and FIG. 10, the control unit 928 is coupled to the control terminals of the switches 901-924 and the reset switches 925 and 926, and which generates the control signals CTR1 and CTR2 and the reset signal RES to control the operations of the switches 901-924 and the reset switches 925 and 926. Herein the control signals CTR1 and CTR2 have a phase difference of 180°.

As shown in FIG. 10, the voltages on the nodes Va_p_x (x=1,..., and M) and Vb_n_k (k=1,..., and L) in FIG. 9 are alternatively the positive reference voltage Vrefp and the negative reference voltage Vrefn in response to the control signal CTR1. Similarly, the voltages on the nodes Va_n and Vb_p in FIG. 10 are alternatively the negative reference voltage Vrefn and the positive reference voltage Vrefp in response to the control signal CTR2. In the present embodiment, the switches 901, 903, 906, 907, 909, 911, 913, 915, 918, 919, 920, 921, and 923 are turned on when the control signal CTR1 is enabled and turned off when the control signal CTR1 is disabled. Similarly, the switches 902, 904, 905, 908, 910, 912, 914, 916, 917, 920, 922, and 924 are turned on when the control signal CTR2 is enabled and turned off when the control signal CTR2 is disabled. Besides, the reset switches 925 and 926 are turned on when the reset signal RES is enabled and turned off when the reset signal RES is disabled.

As described above, the capacitors Cint1 and Cint2 accumulate charges at each rising/falling edge of the control signals CTR1 and CTR2, and the voltages $V_1$–$V_N$ corresponding to the charges accumulated by the capacitors Cint1 and Cint2 during each period (each rising/falling edge can be considered as a period) have following values:

$$V_1 = 1*(Vrefp-Vrefn)*\{[(Cin1\_p\_1+...+Cin1\_p\_M)-Cin1\_n)]+[Cin2\_p-(Cin2\_n\_1+...+Cin2\_n\_L)]\}/Cint;$$

$$V_2 = 2*(Vrefp-Vrefn)*\{[(Cin1\_p\_1+...+Cin1\_p\_M)-Cin1\_n)]+[Cin2\_p-(Cin2\_n\_1+...+Cin2\_n\_L)]\}/Cint;$$

$$V_3 = 3*(Vrefp-Vrefn)*\{[(Cin1\_p\_1+...+Cin1\_p\_M)-Cin1\_n)]+[Cin2\_p-(Cin2\_n\_1+...+Cin2\_n\_L)]\}/Cint;$$

...; and $$V_N = N*(Vrefp-Vrefn)*\{[(Cin1\_p\_1+...+Cin1\_p\_M)-Cin1\_n)]+[Cin2\_p-(Cin2\_n\_1+...+Cin2\_n\_L)]\}/Cint,$$

wherein the capacitances of the feedback capacitors Cint1 and Cint2 are assumed to be Cint.

Accordingly, the charges accumulated by the feedback capacitors Cint1 and Cint2 during each period have the same or very similar values. Namely, there is:

$$(V_2-V_1)=(V_3-V_2)=(V_4-V_3)=...=(V_N-V_{N-1}) \text{ or}$$

$$(V_2-V_1)\approx(V_3-V_2)\approx(V_4-V_3)\approx...\approx(V_N-N_{N-1}).$$

In the present embodiment, the capacitors Cin1_p_1,..., Cin1_p_M, Cin2_n_1,..., and Cin2_n_L are external inductive capacitors of the capacitance interface circuit 900, and the capacitors Cin1_n and Cin2_p are internal adjustable capacitors of the capacitance interface circuit 900. Assuming that the capacitances of the feedback capacitors Cint1 and Cint2 are both Cint, the capacitances of the capacitors. Cin1_p_1,... Cin1_p_M, Cin2_n_1,..., and Cin2_n_L can be respectively divided into fixed capacitances Cfix1_p_1, Cfix1_p_M, Cfix2_n_1,..., and Cfix2_n_L and variable capacitances Cchg1_p_1,... Cchg1_p_M, Cchg2_n_1,..., and Cchg2_n_L. Herein the fixed capacitances Cfix1_p_1,... Cfix1_p_M, Cfix2_n_1,..., and Cfix2_n_L can be considered as fixed values during a short period since they only slowly change along external environmental factors (for example, temperature, humidity, and pressure, etc).

Once the capacitances of the capacitors Cin1_n and Cin2_p are substantially equal or close to the sum of the fixed capacitances Cfix1_p_1,..., and Cfix1_p_M and the sum of the fixed capacitances Cfix2_n_1 and Cfix2_n_L, the fixed capacitance of each external inductive capacitor is cancelled by an internal adjustable capacitor.

Based on foregoing description, in the present embodiment, when the capacitances of the capacitors Cin1_n and Cin2_p are designed to be equal or close to the sum of the fixed capacitances of the external inductive capacitors and charges having a polarity opposite to that of the capacitors Cin1_n/Cin2_n_1,..., and Cin2_n_L are stored in the capacitors Cin1_p_1,..., Cin1_p_M/Cin2_p for neutralizing the effect of the invariable portions of the capacitors Cin1_p_1,..., Cin1_p_M/Cin2_n_1,..., Cin2_n_L, the charge converter composed of the fully-differential amplifier 927 and the feedback capacitors Cint1 and Cint2 needs only work on the variable portions of the capacitors Cin1_p_1,..., Cin1_p_M/Cin2_n_1, Cin2_n_L, so that the accuracy of subsequent data processing is increased.

Sixth Embodiment

Figure 11:
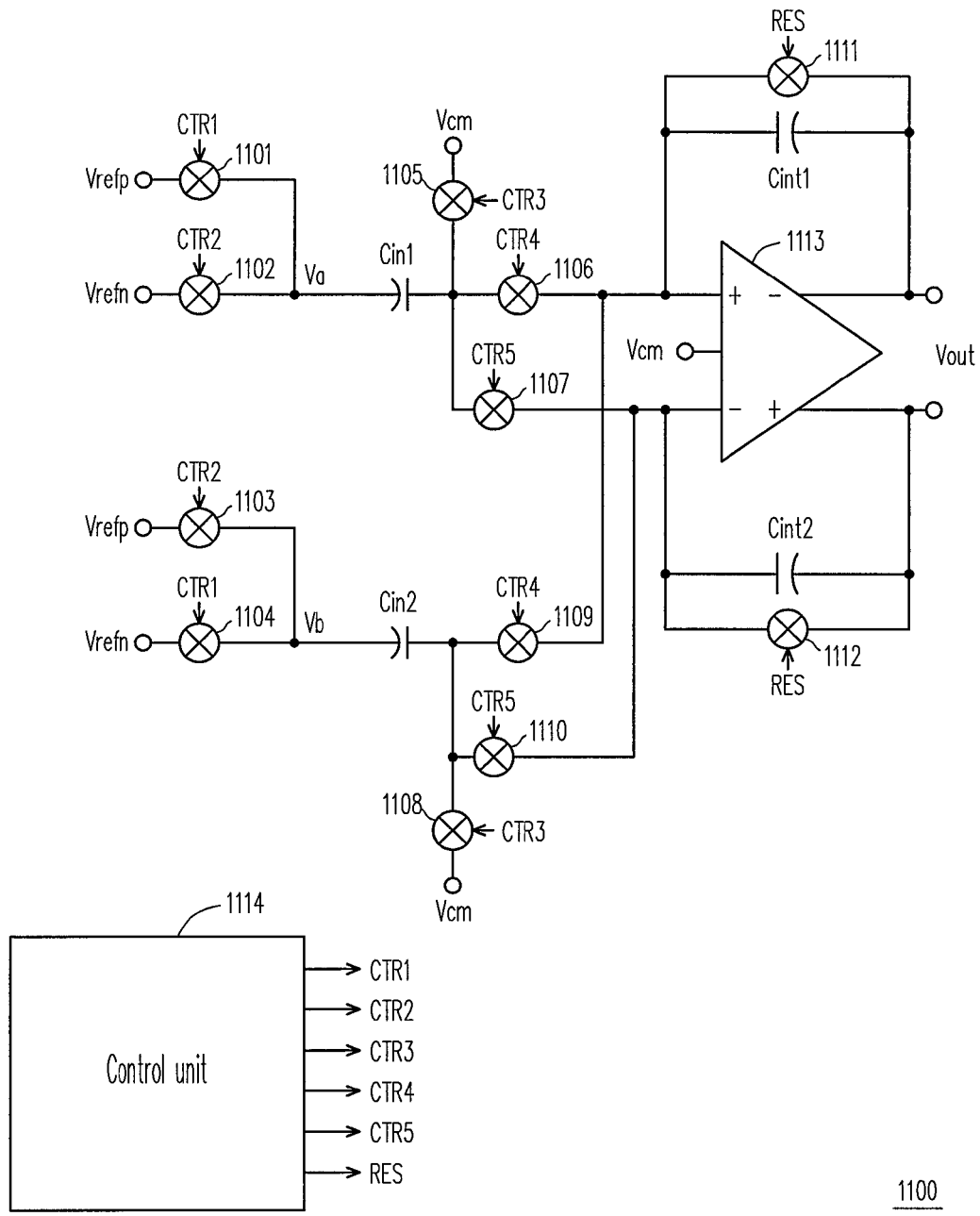
FIG. 11 is a circuit diagram of a capacitance interface circuit 1100 according to a sixth embodiment of the present invention.

FIG. 11 is a circuit diagram of a capacitance interface circuit 1100 according to the sixth embodiment of the present invention. Referring to FIG. 11, the capacitance interface circuit 1100 includes capacitors Cin1 and Cin2, ten switches 1101-1110, two reset switches 1111 and 1112, two feedback capacitors Cint1 and Cint2, a fully-differential amplifier 1113, and a control unit 1114. In the present embodiment, the first terminal of the switch 1101 receives the positive reference voltage Vrefp, and the control terminal of the switch 1101 receives the control signal CTR1. The first terminal of the switch 1102 receives the negative reference voltage Vrefn, the second terminal of the switch 1102 is coupled to the second terminal of the switch 1101, and the control terminal of the switch 1102 receives the control signal CTR2.

The first terminal of the capacitor Cin1 is coupled to the second terminal of the switch 1102. The first terminal of the switch 1103 receives the positive reference voltage Vrefp, and the control terminal of the switch 1103 receives the control signal CTR2. The first terminal of the switch 1104 receives the negative reference voltage Vrefn, the second terminal of the switch 1104 is coupled to the second terminal of the switch 1103, and the control terminal of the switch 1104 receives the control signal CTR1. The first terminal of the capacitor Cin2 is coupled to the second terminal of the switch 1104. The first terminal of the switch 1105 receives the common mode voltage Vcm, the second terminal of the switch 1105 is coupled to the second terminal of the capacitor Cin1, and the control terminal of the switch 1105 receives a control signal CTR3.

The first terminal of the switch 1106 is coupled to the second terminal of the capacitor Cin1, and the control terminal of the switch 1106 receives a control signal CTR4. The first terminal of the switch 1107 is coupled to the second terminal of the capacitor Cin1, and the control terminal of the switch 1107 receives a control signal CTR5. The first terminal of the switch 1108 receives the common mode voltage Vcm, the second terminal of the switch 1108 is coupled to the second terminal of the capacitor Cin2, and the control terminal of the switch 1108 receives the control signal CTR3. The first terminal of the switch 1109 is coupled to the second terminal of the capacitor Cin2, and the control terminal of the switch 1109 receives the control signal CTR4. The first terminal of the switch 1110 is coupled to the second terminal of the capacitor Cin2, and the control terminal of the switch 1110 receives the control signal CTR5. The positive input terminal of the fully-differential amplifier 1113 is coupled to the second terminals of the switches 1106 and 1109, the negative input terminal of the fully-differential amplifier 1113 is coupled to the second terminals of the switches 1107 and 1110, and the common mode receiving terminal of the fully-differential amplifier 1113 receives the common mode voltage Vcm.

The first terminal of the feedback capacitor Cint1 is coupled to the second terminal of the switch 1106, and the second terminal of the feedback capacitor Cint1 is coupled to the negative output terminal of the fully-differential amplifier 1113. The first terminal of the reset switch 1111 is coupled to the first terminal of the feedback capacitor Cint1, the second terminal of the reset switch 1111 is coupled to the second terminal of the feedback capacitor Cint1, and the control terminal of the reset switch 1111 receives the reset signal RES. The first terminal of the feedback capacitor Cint2 is coupled to the second terminal of the switch 1107, and the second terminal of the feedback capacitor Cint2 is coupled to the positive output terminal of the fully-differential amplifier 1113. The first terminal of the reset switches 1112 is coupled to the first terminal of the feedback capacitor Cint2, the second terminal of the reset switches 1112 is coupled to the second terminal of the feedback capacitor Cint2, and the control terminal of the reset switches 1112 receives the reset signal RES.

Figure 12:
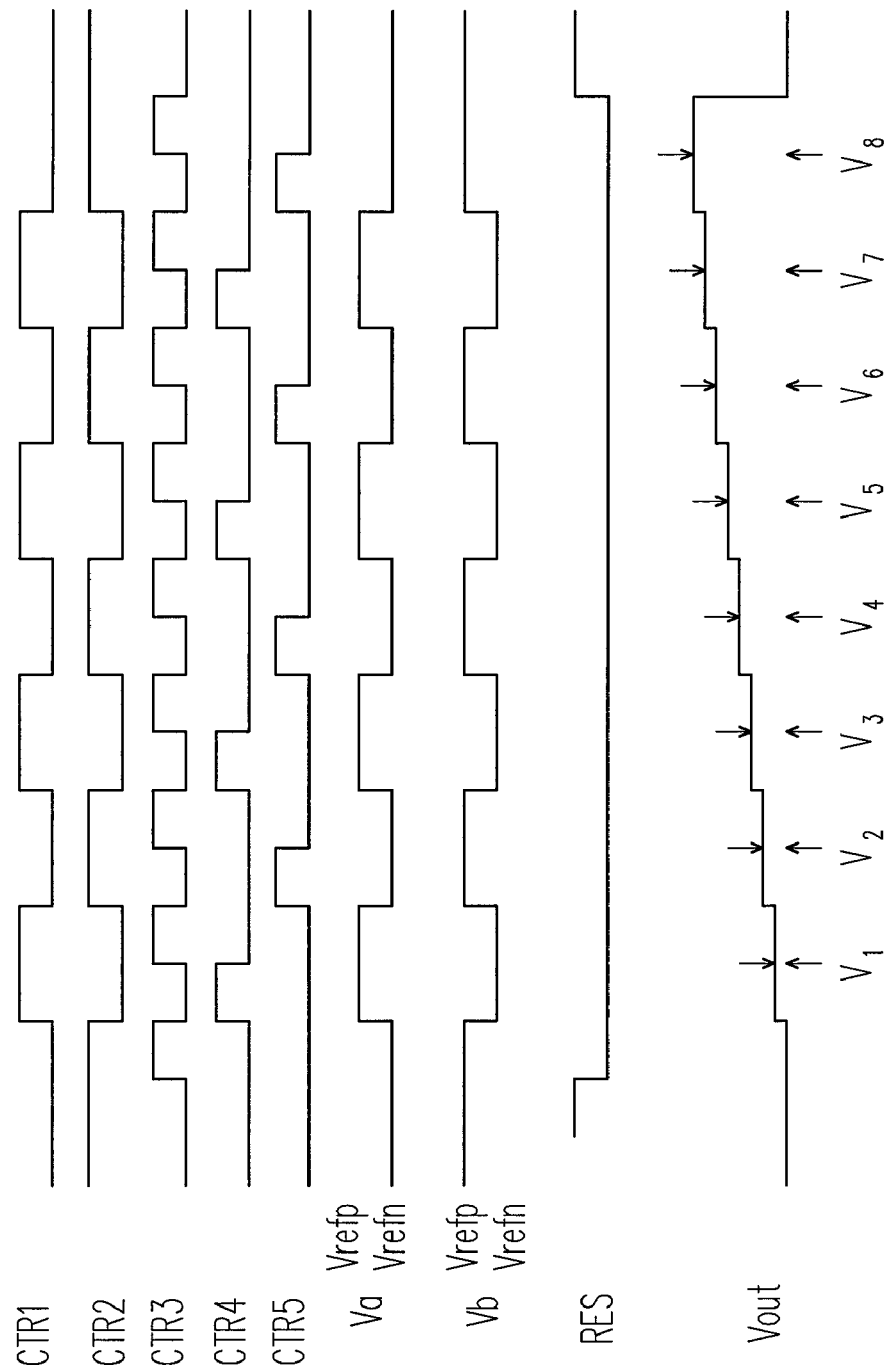
FIG. 12 is an operation timing diagram of the capacitance interface circuit 1100 in FIG. 11.

In the present embodiment, the control signals CTR1-CTR5 and the reset signal RES are generated by the control unit 1114. To be specific, FIG. 12 is an operation timing diagram of the capacitance interface circuit 1100 in FIG. 11. Referring to both FIG. 11 and FIG. 12, the control unit 1114 is coupled to the control terminals of the switches 1101-1110 and the reset switches 1111 and 1112, and which generates the control signals CTR1-CTR5 and the reset signal RES to control the operations of the switches 1101-1110 and the reset switches 1111 and 1112. Herein the control signals CTR1 and CTR2 have a phase difference of 180°, and the duty cycles of the control signals CTR1 and CTR2 are 50%. The cycle of the control signal CTR3 is half of the cycle of the control signal CTR2. The cycle of the control signal CTR4 is the same as the cycle of the control signal CTR1, and the duty cycle of the control signal CTR4 is 25%. The cycle of the control signal CTR5 is the same as the cycle of the control signal CTR2, and the duty cycle of the control signal CTR5 is 25%.

As shown in FIG. 12, the voltages on the node Va in FIG. 11 is alternatively the positive reference voltage Vrefp and the negative reference voltage Vrefn in response to the control signal CTR1. Similarly, the voltage on the node Vb in FIG. 11 is alternatively the negative reference voltage Vrefn and the positive reference voltage Vrefp in response to the control signal CTR2. In the present embodiment, the switches 1101 and 1104 are turned on when the control signal CTR1 is enabled and turned off when the control signal CTR1 is disabled. Similarly, the switches 1102 and 1103 are turned on when the control signal CTR2 is enabled and turned off when the control signal CTR2 is disabled.

In addition, the switches 1105 and 1108 are turned on when the control signal CTR3 is enabled and turned off when the control signal CTR3 is disabled. The switches 1106 and 1109 are turned on when the control signal CTR4 is enabled and turned off when the control signal CTR4 is disabled. Similarly, the switches 1107 and 1110 are turned on when the control signal CTR5 is enabled and turned off when the control signal CTR5 is disabled. The reset switches 1111 and 1112 are turned on when the reset signal RES is enabled and turned off when the reset signal RES is disabled.

As described above, assuming that the capacitors Cin1 and Cin2 are respectively an external inductive capacitor of the capacitance interface circuit 1100 and the capacitances of the feedback capacitors Cint1 and Cint2 are both Cint, the output voltage Vout of the capacitance interface circuit 1100 is similar to that of the capacitance interface circuit 400 in FIG. 4 (i.e., in direct ratio to the capacitance difference between the capacitors Cin1 and Cin2) therefore will not be described herein. On the other hand, assuming that the capacitor Cin1 is an external inductive capacitor of the capacitance interface circuit 1100, the capacitor Cin2 is an internal adjustable capacitor (for example, a variable capacitor; however, the present invention is not limited thereto) of the capacitance interface circuit 1100, and the capacitances of the feedback capacitors Cint1 and Cint2 are both Cint, the output voltage Vout of the capacitance interface circuit 1100 is also similar to that of the capacitance interface circuit 400 in FIG. 4 (i.e., in direct ratio to the variable capacitance Cchg1 of the capacitor Cin1) therefore will not be described herein.

Accordingly, in the present embodiment, the same or similar amount of charges are accumulated by the capacitors Cint1 and Cint2 during each period (i.e., $(V_2-V_1)=(V_3-V_2)=(V_4-V_3)= \ldots =(V_N-V_{N-1})$ or $(V_2-V_1) \approx (V_3-V_2) \approx (V_4-V_3) \approx \ldots \approx (V_N-V_{N-1})$). In other words, the same function is achieved by the capacitance interface circuit 1100 in the present embodiment as by the capacitance interface circuit 400 in the second embodiment.

Seventh Embodiment

Figure 13:
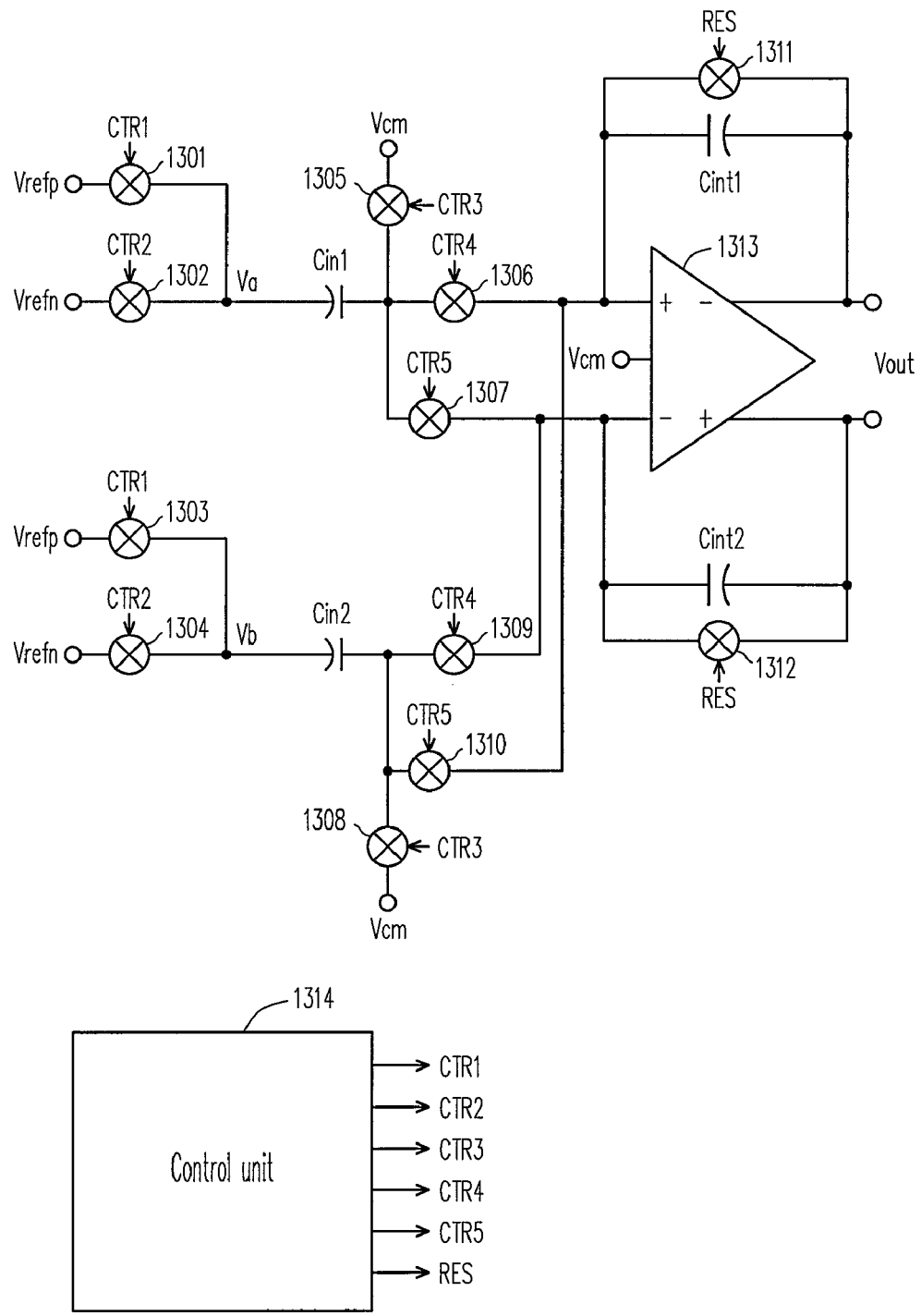
FIG. 13 is a circuit diagram of a capacitance interface circuit 1300 according to a seventh embodiment of the present invention.

FIG. 13 is a circuit diagram of a capacitance interface circuit 1300 according to the seventh embodiment of the present invention. Referring to both FIG. 11 and FIG. 13, elements similar to those of the capacitance interface circuit 1100 are denoted with similar reference numerals in FIG. 13. It should be noted that the control terminal of the switch 1103 receives the control signal CTR2, and the control terminal of the switch 1104 receives the control signal CTR1. The control terminal of the switch 1303 receives the control signal CTR1, and the control terminal of the switch 1304 receives the control signal CTR2. The second terminal of the switch 1109 is coupled to the second terminal of the switch 1106, and the second terminal of the switch 1110 is coupled to the second terminal of the switch 1107. The second terminal of the switch 1309 is coupled to the second terminal of the switch 1307, and the second terminal of the switch 1310 is coupled to the second terminal of the switch 1306.

Figure 14:
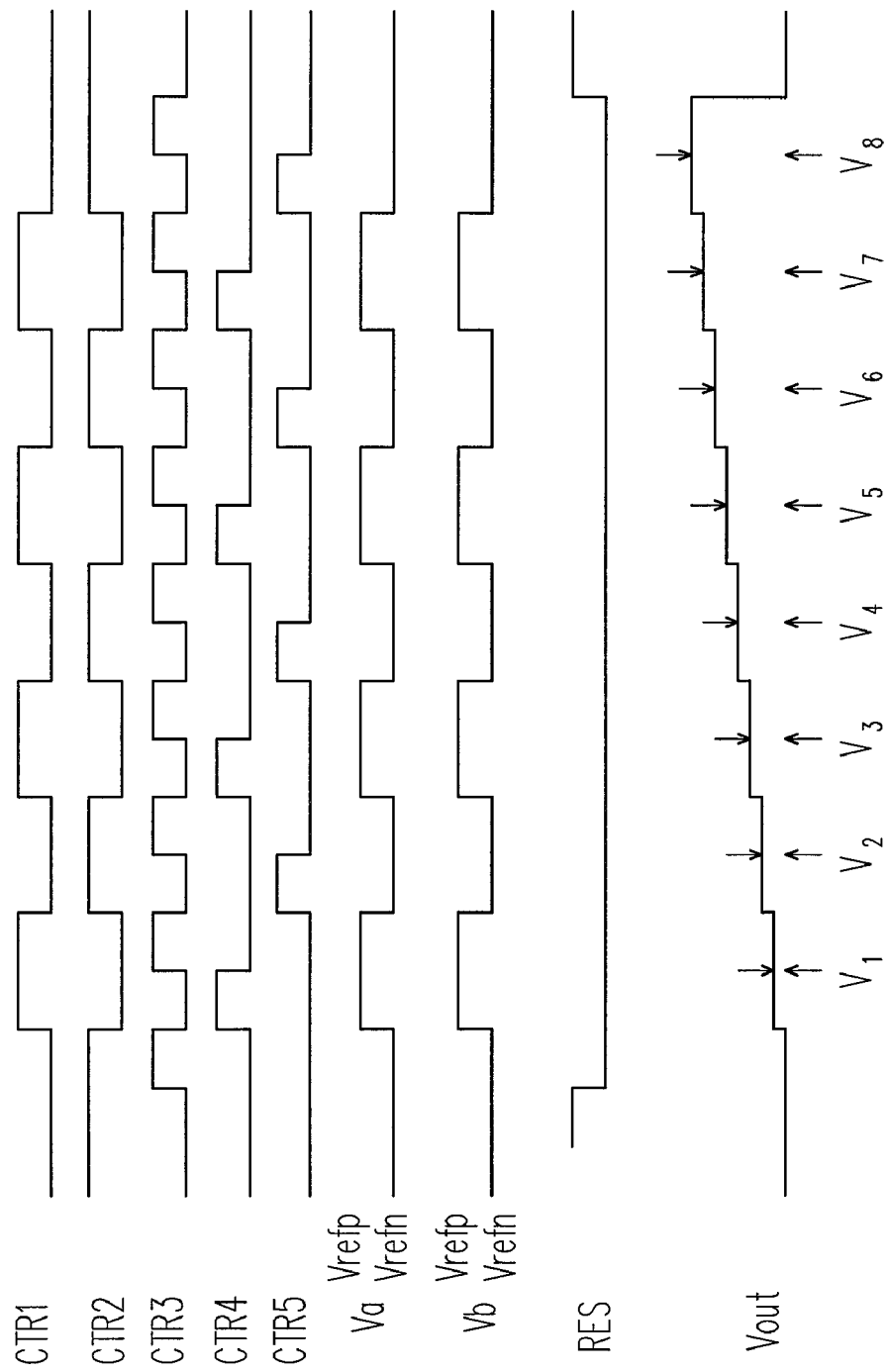
FIG. 14 is an operation timing diagram of the capacitance interface circuit 1300 in FIG. 13.

FIG. 14 is an operation timing diagram of the capacitance interface circuit 1300 in FIG. 13. Referring to both FIG. 13 and FIG. 14, the control unit 1314 is coupled to the control terminals of the switches 1301-1310 and the reset switches 1311 and 1312, and which generates the control signals CTR1 and CTR2 and the reset signal RES to control the operations of the switches 1301-1310 and the reset switches 1311 and 1312.

As described above, assuming that the capacitors Cin1 and Cin2 are respectively an external inductive capacitor of the capacitance interface circuit 1300 and the capacitances of the feedback capacitors Cint1 and Cint2 are both Cint, the output voltage Vout of the capacitance interface circuit 1300 is similar to that of the capacitance interface circuit 600 in FIG. 6 (i.e., in direct ratio to the capacitance difference between the capacitors Cin1 and Cin2) therefore will not be described herein. On the other hand, assuming that the capacitor Cin1 is an external inductive capacitor of the capacitance interface circuit 1300, the capacitor Cin2 is an internal adjustable capacitor (for example, a variable capacitor; however, the present invention is not limited thereto) of the capacitance interface circuit 1300, and the capacitance of the feedback capacitors Cint1 and Cint2 is Cint, the output voltage Vout of the capacitance interface circuit 1300 is also similar to that of the capacitance interface circuit 600 in FIG. 6 (i.e., in direct ratio to the variable capacitance Cchg1 of the capacitor Cin1) therefore will not be described herein.

Accordingly, in the present embodiment, the same or similar amount of charges are accumulated by the capacitors Cint1 and Cint2 during each period (i.e., $(V_2-V_1)=(V_3-V_2)=(V_4-V_3)=\ldots=(V_N-V_{N-1})$ or $(V_2-V_1)\approx(V_3-V_2)\approx(V_4-V_3)\approx\ldots\approx(N_N-V_{N-1})$). In other words, the same function can be achieved by the capacitance interface circuit 1300 in the present embodiment as by the capacitance interface circuit 600 in the third embodiment.

Eighth Embodiment

Figure 15:
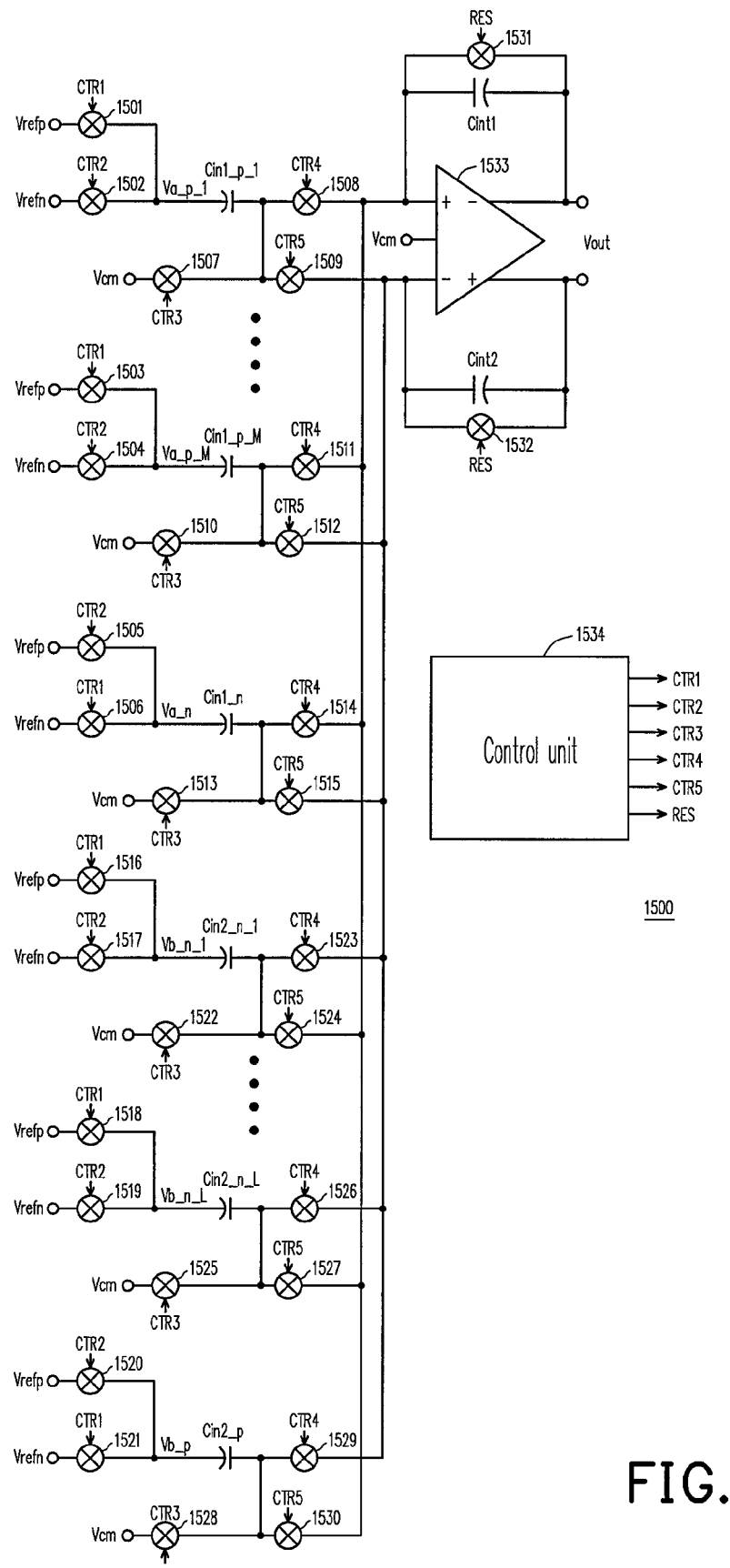
FIG. 15 is a circuit diagram of a capacitance interface circuit 1500 according to an eighth embodiment of the present invention.

FIG. 15 is a circuit diagram of a capacitance interface circuit 1500 according to the eighth embodiment of the present invention. Referring to FIG. 15, the capacitance interface circuit 1500 includes capacitors Cin1_p_x (x=1, . . . , and M, wherein M is a positive integer), Cin1_n, Cin2_n_k (k=1, . . . , and L, wherein L is a positive integer), and Cin2_p, switches 1501-1530, two reset switches 1531 and 1532, two feedback capacitors Cint1 and Cint2, a fully-differential amplifier 1533, and a control unit 1534.

Referring to both FIG. 9 and FIG. 15, elements similar to those of the capacitance interface circuit 900 are denoted with similar reference numerals in FIG. 15. Compared to the capacitance interface circuit 900, the capacitance interface circuit 1500 further has switches 1507, 1510, 1513, 1522, 1525, and 1528. The first terminals of the switches 1507, 1510, 1513, 1522, 1525, and 1528 receive the common mode voltage Vcm, the second terminals of the switches 1507, 1510, 1513, 1522, 1525, and 1528 are connected to the second terminals of the capacitors Cin1_p_x, Cin1_n, Cin2_n_k, and Cin2_p, and the control terminals of the switches 1507, 1510, 1513, 1522, 1525, and 1528 receive the control signal CTR3. In addition, it should be noted that the control terminals of the switches 1508, 1511, 1514, 1523, 1526, and 1529 receive the control signal CTR4, and the control terminals of the switches 1509, 1512, 1515, 1524, 1527, and 1530 receive the control signal CTR5.

Figure 16:
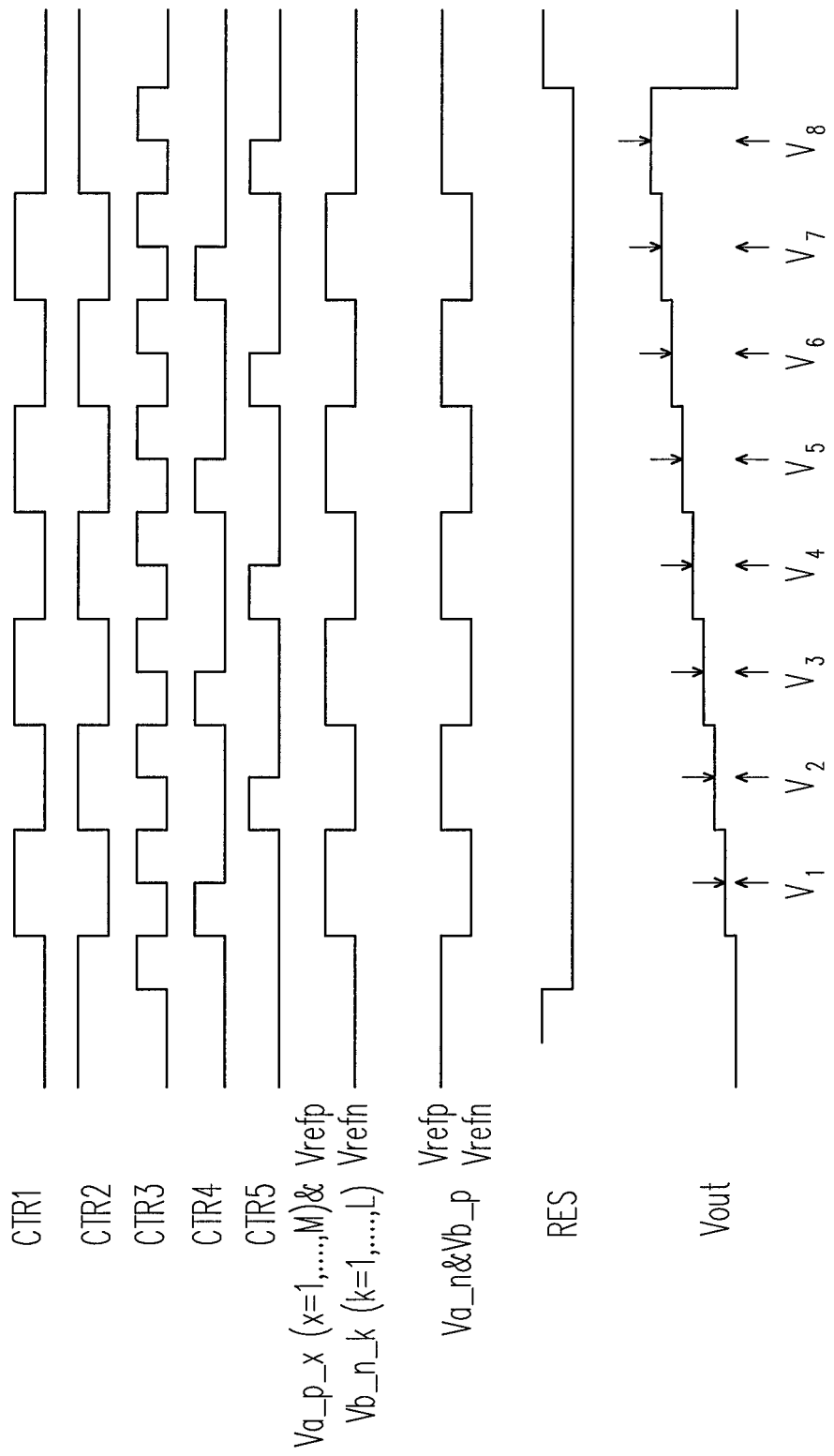
FIG. 16 is an operation timing diagram of the capacitance interface circuit 1500 in FIG. 15.

In the present embodiment, the control signals CTR1-CTR5 are generated by the control unit 1534. To be specific, FIG. 16 is an operation timing diagram of the capacitance interface circuit 1500 in FIG. 15. Referring to both FIG. 15 and FIG. 16, the control signals CTR1 and CTR2 have a phase difference of 180°, and the duty cycles of the control signals CTR1 and CTR are 50%. The cycle of the control signal CTR3 is half of the cycle of the control signal CTR2. The cycle of the control signal CTR4 is the same as the cycle of the control signal CTR1, and the duty cycle of the control signal CTR4 is 25%. The cycle of the control signal CTR5 is the same as the cycle of the control signal CTR2, and the duty cycle of the control signal CTR5 is 25%.

As shown in FIG. 16, the voltages on the nodes Va_p_x and Vb_n_k in FIG. 15 are alternatively the positive reference voltage Vrefp and the negative reference voltage Vrefn according to the control signal CTR1. Similarly, the voltages on the nodes Va_n and Vb_p in FIG. 15 are alternatively the negative reference voltage Vrefn and the positive reference voltage Vrefp according to the control signal CTR2.

As described above, assuming that the capacitors Cin1_n, Cin1_p_x, Cin2_p, and Cin2_n_k are respectively an external inductive capacitor of the capacitance interface circuit 1500 and the capacitances of the feedback capacitors Cint1 and Cint2 are both Cint, the output voltage Vout of the capacitance interface circuit 1500 is similar to that of the capacitance interface circuit 900 (i.e., in direct ratio of the sum of the capacitance difference between the capacitors Cin1_p and Cin1_n and the capacitance difference between the sum of the capacitances of the capacitors Cin1_p_x and the sum of the capacitances of the capacitors Cin2_n_k.

On the other hand, assuming that the capacitors Cin1_p_x and Cin2_n_k are respectively an external inductive capacitor of the capacitance interface circuit 1500, the capacitors Cin1_n and Cin2_p are internal adjustable capacitors of the capacitance interface circuit 1500, and the capacitances of the feedback capacitors Cint1 and Cint2 are both Cint, the output voltage Vout of the capacitance interface circuit 1500 is also similar to that of the capacitance interface circuit 900 (i.e., in direct ratio to the capacitance difference between the sum of the variable capacitances Cchg_p_x of the capacitors Cin1_p_x and the sum of the variable capacitances Cchg_n_k of the capacitors Cin2_n_k) therefore will not be described herein. In other words, the same function can be achieved by the capacitance interface circuit 1500 in the present embodiment as by the capacitance interface circuit 900 in the fifth embodiment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A capacitance interface circuit, comprising:
   a first switch, having a first terminal for receiving a positive reference voltage and a control terminal for receiving a first control signal;
   a second switch, having a first terminal for receiving a negative reference voltage, a second terminal coupled to a second terminal of the first switch, and a control terminal for receiving a second control signal;
   a first capacitor, having a first terminal coupled to the second terminal of the second switch;
   a third switch, having a first terminal for receiving the positive reference voltage and a control terminal for receiving the second control signal;
   a fourth switch, having a first terminal for receiving the negative reference voltage, a second terminal coupled to a second terminal of the third switch, and a control terminal for receiving the first control signal;
   a second capacitor, having a first terminal coupled to the second terminal of the fourth switch;
   a fifth switch, having a first terminal coupled to a second terminal of the first capacitor and a control terminal for receiving a third control signal;
   a sixth switch, having a first terminal coupled to the second terminal of the first capacitor and a control terminal for receiving a fourth control signal;

a seventh switch, having a first terminal coupled to a second terminal of the second capacitor and a control terminal for receiving the third control signal;
an eighth switch, having a first terminal coupled to the second terminal of the second capacitor and a control terminal for receiving the fourth control signal;
a fully-differential amplifier, having a positive input terminal coupled to second terminals of the fifth switch and the seventh switch, a negative input terminal coupled to second terminals of the sixth switch and the eighth switch, a common mode receiving terminal for receiving a common mode voltage, and a output voltage of the fully differential amplifier between a positive output terminal and a negative output terminal;
a first feedback capacitor, having a first terminal coupled to the second terminal of the fifth switch and a second terminal coupled to a negative output terminal of the fully-differential amplifier;
a second feedback capacitor, having a first terminal coupled to the second terminal of the sixth switch and a second terminal coupled to a positive output terminal of the fully-differential amplifier;
a ninth switch, having a first terminal for receiving the common mode voltage, a control terminal for receiving a fifth control signal, and a second terminal coupled to the second terminal of the first capacitor; and
a tenth switch, having a first terminal for receiving the common mode voltage, a control terminal for receiving the fifth control signal, and a second terminal coupled to the second terminal of the second capacitor,
wherein a capacitance of the second capacitor is randomly set to a first value and then the output voltage of the fully differential amplifier can be obtained based on a difference of the first value and a capacitance of the first capacitor,
and the capacitance of the second capacitor is modified according to the output voltage of the fully differential amplifier so as to make the output voltage of the fully differential amplifier substantially equal to zero.

2. The capacitance interface circuit according to claim 1, wherein the first control signal and the second control signal have a phase difference of 180°, duty cycles of the first control signal and the second control signal are 50%, a cycle of the fifth control signal is half of a cycle of the second control signal, a cycle of the third control signal is the same as a cycle of the first control signal, a duty cycle of the third control signal is 25%, a cycle of the fourth control signal is the same as the cycle of the second control signal, and a duty cycle of the fourth control signal is 25%.

3. The capacitance interface circuit according to claim 1, wherein the first capacitor and the second capacitor are respectively an external inductive capacitor of the capacitance interface circuit.

4. The capacitance interface circuit according to claim 1, wherein the first capacitor is a first external inductive capacitor of the capacitance interface circuit, the second capacitor is a first internal adjustable capacitor of the capacitance interface circuit, a capacitance of the first capacitor comprises a first fixed capacitance and a first variable capacitance, and a capacitance of the second capacitor is substantially equal to the first fixed capacitance.

5. A capacitance interface circuit, comprising:
a first switch, having a first terminal for receiving a positive reference voltage and a control terminal for receiving a first control signal;
a second switch, having a first terminal for receiving a negative reference voltage, a second terminal coupled to a second terminal of the first switch, and a control terminal for receiving a second control signal;
a first capacitor, having a first terminal coupled to the second terminal of the second switch;
a third switch, having a first terminal for receiving the positive reference voltage and a control terminal for receiving the first control signal;
a fourth switch, having a first terminal for receiving the negative reference voltage, a second terminal coupled to a second terminal of the third switch, and a control terminal for receiving the second control signal;
a second capacitor, having a first terminal coupled to the second terminal of the fourth switch;
a fifth switch, having a first terminal coupled to a second terminal of the first capacitor and a control terminal for receiving a third control signal;
a sixth switch, having a first terminal coupled to the second terminal of the first capacitor and a control terminal for receiving a fourth control signal;
a seventh switch, having a first terminal coupled to a second terminal of the second capacitor and a control terminal for receiving the third control signal;
an eighth switch, having a first terminal coupled to a second terminal of the second capacitor and a control terminal for receiving the fourth control signal;
a fully-differential amplifier, having a positive input terminal coupled to second terminals of the fifth switch and the eighth switch, a negative input terminal coupled to second terminals of the sixth switch and the seventh switch, and a common mode receiving terminal for receiving a common mode voltage, and a output voltage of the fully differential amplifier between a positive output terminal and a negative output terminal;
a first feedback capacitor, having a first terminal coupled to the second terminal of the fifth switch and a second terminal coupled to a negative output terminal of the fully-differential amplifier;
a second feedback capacitor, having a first terminal coupled to the second terminal of the sixth switch and a second terminal coupled to a positive output terminal of the fully-differential amplifier;
a ninth switch, having a first terminal for receiving the common mode voltage, a control terminal for receiving a fifth control signal, and a second terminal coupled to the second terminal of the first capacitor; and
a tenth switch, having a first terminal for receiving the common mode voltage, a control terminal for receiving the fifth control signal, and a second terminal coupled to the second terminal of the second capacitor,
wherein a capacitance of the second capacitor is randomly set to a first value and then the output voltage of the fully differential amplifier can be obtained based on a difference of the first value and a capacitance of the first capacitor,
and the capacitance of the second capacitor is modified according to the output voltage of the fully differential amplifier so as to make the output voltage of the fully differential amplifier substantially equal to zero.

6. The capacitance interface circuit according to claim 5, wherein the first control signal and the second control signal have a phase difference of 180°, duty cycles of the first control signal and the second control signal are 50%, a cycle of the fifth control signal is half of a cycle of the second control signal, a cycle of the third control signal is the same as a cycle of the first control signal, a duty cycle of the third control signal is 25%, a cycle of the fourth control signal is the same as the cycle of the second control signal, and a duty cycle of the fourth control signal is 25%.

7. The capacitance interface circuit according to claim 5, wherein the first capacitor and the second capacitor are respectively an external inductive capacitor of the capacitance interface circuit.

8. The capacitance interface circuit according to claim 5, wherein the first capacitor is a first external inductive capacitor of the capacitance interface circuit, the second capacitor is a first internal adjustable capacitor of the capacitance interface circuit, a capacitance of the first capacitor comprises a first fixed capacitance and a first variable capacitance, and a capacitance of the second capacitor is substantially equal to the first fixed capacitance.

\* \* \* \* \*